(12) United States Patent
Sato et al.

(10) Patent No.: US 11,714,302 B2
(45) Date of Patent: *Aug. 1, 2023

(54) OPTICAL ELEMENT AND LIGHT GUIDE ELEMENT

(71) Applicant: FUJIFILM Corporation, Tokyo (JP)

(72) Inventors: Hiroshi Sato, Minami-ashigara (JP); Yukito Saitoh, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 283 days.

This patent is subject to a terminal disclaimer.

(21) Appl. No.: 16/913,970

(22) Filed: Jun. 26, 2020

(65) Prior Publication Data

US 2020/0348545 A1 Nov. 5, 2020

Related U.S. Application Data

(63) Continuation of application No. PCT/JP2018/048264, filed on Dec. 27, 2018.

(30) Foreign Application Priority Data

Dec. 28, 2017 (JP) .............................. JP2017-253979

(51) Int. Cl.
*G02F 1/11* (2006.01)
*G02F 1/1335* (2006.01)
(Continued)

(52) U.S. Cl.
CPC ........ *G02F 1/116* (2013.01); *G02F 1/133516* (2013.01); *G02F 1/133638* (2021.01);
(Continued)

(58) Field of Classification Search
CPC ................. G02B 5/3016; G02B 5/1871; G02B 2005/1804; G02F 1/133638; G02F 1/292; G02F 1/29
See application file for complete search history.

(56) References Cited

U.S. PATENT DOCUMENTS 3,711,181 A 1/1973 Adams et al.
5,999,240 A * 12/1999 Sharp ............... G02F 1/0136
356/368

(Continued)

FOREIGN PATENT DOCUMENTS

JP 47-32843 A 11/1972
JP 2008-532085 A 8/2008
(Continued)

OTHER PUBLICATIONS

International Preliminary Report on Patentability and Written Opinion of the International Searching Authority, with an English translation (forms PCT/IB/373, PCT/ISA/237 and PCT/IB326), dated Jaly 9, 2020, for corresponding International Application No. PCT/JP2018/048264.

(Continued)

*Primary Examiner* — Alexander P Gross
(74) *Attorney, Agent, or Firm* — Birch, Stewart, Kolasch & Birch, LLP

(57) ABSTRACT

An object is to provide an optical element in which a wavelength dependence of refraction of transmitted light is small, and a light guide element including the optical element. The optical element includes: plurality of optically-anisotropic layers that are formed using a composition including a liquid crystal compound and have a liquid crystal alignment pattern in which a direction of an optical axis derived from the liquid crystal compound continuously rotates in one in-plane direction; and a wavelength selective phase difference layer that is disposed between two optically-anisotropic layers and converts circularly polarized light in a specific wavelength range into circularly polarized light having an opposite turning direction, in which, in a case where, in the liquid crystal alignment pattern, a length over which the direction of the optical axis rotates by 180° in the in-plane direction in which the direction of the optical axis (Continued)

changes is set as a single period, a length of the single period in at least one optically-anisotropic layer is different from that of another optically-anisotropic layer.

16 Claims, 9 Drawing Sheets

(51) Int. Cl.
*G02F 1/1337* (2006.01)
*G02F 1/29* (2006.01)
*G02F 1/13363* (2006.01)

(52) U.S. Cl.
CPC .......... *G02F 1/133753* (2013.01); *G02F 1/29* (2013.01); *G02F 1/292* (2013.01); *G02F 1/133541* (2021.01)

(56) References Cited

U.S. PATENT DOCUMENTS

| | | | |
|---|---|---|---|
| 11,067,860 | B2 | 7/2021 | Oh et al. |
| 11,385,390 | B2* | 7/2022 | Sato ................. G02B 6/0056 |
| 2010/0225876 | A1 | 9/2010 | Escuti et al. |
| 2012/0086903 | A1 | 4/2012 | Escuti |
| 2012/0188467 | A1* | 7/2012 | Escuti ................ G02F 1/1347 349/1 |
| 2013/0335683 | A1 | 12/2013 | Escuti et al. |
| 2014/0016081 | A1 | 1/2014 | Kakubari et al. |
| 2016/0231568 | A1 | 8/2016 | Saarikko et al. |
| 2017/0010466 | A1 | 1/2017 | Klug et al. |
| 2018/0131917 | A1* | 5/2018 | Sato ................. G03B 21/005 |
| 2019/0018248 | A1 | 1/2019 | Nishiyama et al. |
| 2020/0081170 | A1 | 3/2020 | Saitoh et al. |
| 2021/0033764 | A1* | 2/2021 | Sato ................. G02B 27/0172 |
| 2021/0397011 | A1 | 12/2021 | Otani et al. |

FOREIGN PATENT DOCUMENTS

| | | |
|---|---|---|
| JP | 2010-525394 A | 7/2010 |
| JP | 2012-505430 A | 3/2012 |
| JP | 2012-215794 A | 11/2012 |
| JP | 2018-521350 A | 8/2018 |
| WO | WO 2016/194890 A1 | 12/2016 |
| WO | WO 2016/205256 A1 | 12/2016 |
| WO | WO 2018/150773 A1 | 8/2018 |
| WO | WO 2018/212348 A1 | 11/2018 |

OTHER PUBLICATIONS

International Search Report (form PCTASA/210), dated Apr. 2, 2019, for corresponding International Application No. PCT/JP2018/048264, with an English translation.
Kress et al., "Towards the Ultimate Mixed Reality Experience: HoloLens Display Architecture Choices," SID 2017 DIGEST, 2017, pp. 127-131.
Japanese Office Action for corresponding Japanese Application No. 2019-562186, dated Jul. 6, 2021, with English translation.
International Preliminary Report on Patentability and Written Opinion of the international Searching Authority (Forms PCT/IB/326, PCT/IB/373, and PCT/ISA/237) for International Application No. PCT/JP2019/015022, dated Oct. 15, 2020, and an English translation.
International Search Report (Form PCT/ISA/210) for International Application No. PCT/JP2019/015022, dated Jul. 2, 2019, with an English translation.

* cited by examiner

OPTICAL ELEMENT AND LIGHT GUIDE ELEMENT

CROSS-REFERENCE TO RELATED APPLICATIONS

This application is a Continuation of PCT International Application No. PCT/JP2018/048264 filed on Dec. 27, 2018, which claims priority under 35 U.S.C. § 119(a) to Japanese Patent Application No. 2017-253979 filed on Dec. 28, 2017. The above application is hereby expressly incorporated by reference, in its entirety, into the present application.

BACKGROUND OF THE INVENTION

1. Field of the Invention

The present invention relates to an optical element that refracts transmitted light and a light guide element including the optical element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that is actually being seen by a user.

In AR glasses, light (projection light) projected from a display is diffracted (refracted) using a diffraction element to be incident into one end portion of a light guide plate. As a result, the light is incident into the light guide plate with an angle such that the light propagates in the light guide plate. The light propagated in the light guide plate is also diffracted by the diffraction element in the other end portion of the light guide plate and is emitted from the light guide plate to an observation position by the user.

As the light guide plate used in the AR glasses, for example, a light guide plate (waveguide) described in US2016/0231568A is known.

This light guide plate includes a front surface and a rear surface from which light is reflected and guided, a first portion that is provided on the front surface or the rear surface, and a second portion that is provided on the front surface or the rear surface. The first portion has a structure which causes light to change phase upon reflection from the first portion by a first amount. In addition, the second portion on the same surface has a different structure which causes light to change phase upon reflection from the second portion by a second amount different from the first amount, the structure different from the first portion. Further, in the light guide plate, the first portion is offset from the second portion by a distance which substantially matches the difference between the second amount and the first amount.

SUMMARY OF THE INVENTION

However, as also described in US2016/0231568, an angle of light diffraction by a diffraction element depends on the wavelength of the light. That is, an advancing direction of light diffracted by a diffraction element varies depending on the wavelength of the light.

Accordingly, in a case where light components having different wavelengths are refracted by one diffraction element to be incident into a light guide plate and are emitted from the light guide plate, for example, in the case of a color image consisting of a red image, a green image, and a blue image, a so-called color shift in which positions of the red image, the green image, and the blue image are different from each other occurs.

In order to solve the problem, in the AR glasses described in Bernard C. Kress et al., Towards the Ultimate Mixed Reality Experience: HoloLens Display Architecture Choices, SID 2017 DIGEST, pp. 127-131, three elongated light guide plates corresponding to the red image, the green image, and the blue image in which a diffraction element (surface relief grating (SRG)) is provided at opposite ends are prepared, the three light guide plates including the diffraction element are laminated, and a projection image of each of the colors displayed by a display is guided to an observation position by a user such that a color image is displayed.

As a result, in the AR glasses, the positions of the red image, the green image, and the blue image are matched to each other, and a color image having no color shift is displayed.

This way, in the AR glasses of the related art, the image displayed by the display is guided to the observation position by the user. Therefore, it is necessary to laminate the three light guide plates including the diffraction element. Thus, as a whole, the light guide plate is thick and heavy. Further, the device configuration is also complicated.

An object of the present invention is to solve the above-described problem of the related art and to provide an optical element in which a wavelength dependence of an angle of transmitted light is small and for example, red light, green light, and blue light incident from the same direction can be refracted and transmitted substantially in the same direction, and a light guide element including the optical element.

In order to achieve the object, an optical element according to the present invention has the following configurations.

[1] An optical element comprising:

a plurality of optically-anisotropic layers that are formed using a composition including a liquid crystal compound and have a liquid crystal alignment pattern in which a direction of an optical axis derived from the liquid crystal compound changes while continuously rotating in at least one in-plane direction; and a wavelength selective phase difference layer that is disposed between at least one pair of two optically-anisotropic layers adjacent to each other among the plurality of optically-anisotropic layers and converts circularly polarized light in a specific wavelength range into circularly polarized light having an opposite turning direction, in which, in a case where, in the liquid crystal alignment pattern of the optically-anisotropic layer, a length over which the direction of the optical axis derived from the liquid crystal compound rotates by 180° in the in-plane direction in which the direction of the optical axis derived from the liquid crystal compound changes while continuously rotating is set as a single period, a length of the single period in at least one optically-anisotropic layer is different from that of another optically-anisotropic layer.

In the present invention, the two optically-anisotropic layers adjacent to each other (one pair of optically-anisotropic layers adjacent to each other) do not refer to specific optically-anisotropic layers and refer to any two optically-anisotropic layers selected from the plurality of optically-anisotropic layers.

[2] The optical element according to [1], comprising the wavelength selective phase difference layers that are disposed between plural pairs of continuous optically-anisotropic layers, respectively, in which a specific wavelength range in which circularly polarized light is converted by the wavelength selective phase difference layer gradually decreases in an arrangement direction of the optically-anisotropic layer.

[3] The optical element according to [1] or [2], in which the length of the single period in the liquid crystal alignment pattern of the optically-anisotropic layer varies depending on all the optically-anisotropic layers.

[4] The optical element according to any one of [1] to [3], in which the optically-anisotropic layers and the wavelength selective phase difference layers are alternately disposed.

[5] The optical element according to any one of [1] to [4], in which in the optically-anisotropic layer positioned at one end in an arrangement direction of the optically-anisotropic layers, the length of the single period in the liquid crystal alignment pattern is the shortest.

[6] The optical element according to any one of [1] to [5], in which at least one of the optically-anisotropic layers has in-plane regions having different lengths of the single periods in the liquid crystal alignment pattern.

[7] The optical element according to [6], in which the length of the single period in the liquid crystal alignment pattern gradually decreases in the in-plane direction in which the direction of the optical axis derived from the liquid crystal compound changes while continuously rotating in the liquid crystal alignment pattern.

[8] The optical element according to any one of [1] to [7], in which the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

[9] The optical element according to any one of [1] to [8], comprising:

three or more optically-anisotropic layers; and two or more wavelength selective phase difference layers.

[10] The optical element according to [9], wherein one wavelength selective phase difference layer converts circularly polarized light of red light into circularly polarized light having an opposite turning direction, and another wavelength selective phase difference layer converts circularly polarized light of green light into circularly polarized light having an opposite turning direction.

[11] The optical element according to any one of [1] to [10], in which the number of the wavelength selective phase difference layers is less than the number of the optically-anisotropic layers by one.

[12] The optical element according to any one of [1] to [11], in which the wavelength selective phase difference layer is consisting of a plurality of phase difference layers, and an in-plane slow axis direction of at least one phase difference layer is different from that of another phase difference layer.

[13] The optical element according to [12], in which at least one phase difference layer in the wavelength selective phase difference layer is a λ/4 plate.

[14] The optical element according to [13], in which the λ/4 plate in the wavelength selective phase difference layer has reverse wavelength dispersibility, and at least one other phase difference layer has forward wavelength dispersibility.

[15] A light guide element comprising:

the optical element according to any one of [1] to [14]; and a light guide plate.

[16] The light guide element according to [15], in which two optical elements spaced from each other are provided in the light guide plate.

In the optical element according to the present invention, the wavelength dependence of the refraction angle is small, and for example, red light, green light, and blue light incident from the same direction can be refracted to be emitted substantially in the same direction. In addition, in the light guide element according to the present invention including the above-described optical element, with one light guide plate, a plurality of light components having different wavelengths can be guided and emitted without a color shift.

BRIEF DESCRIPTION OF THE DRAWINGS

FIG. 10 is a conceptual diagram showing the action of the optical element shown in

FIG. 8.

DESCRIPTION OF THE PREFERRED EMBODIMENTS

Figure 1:
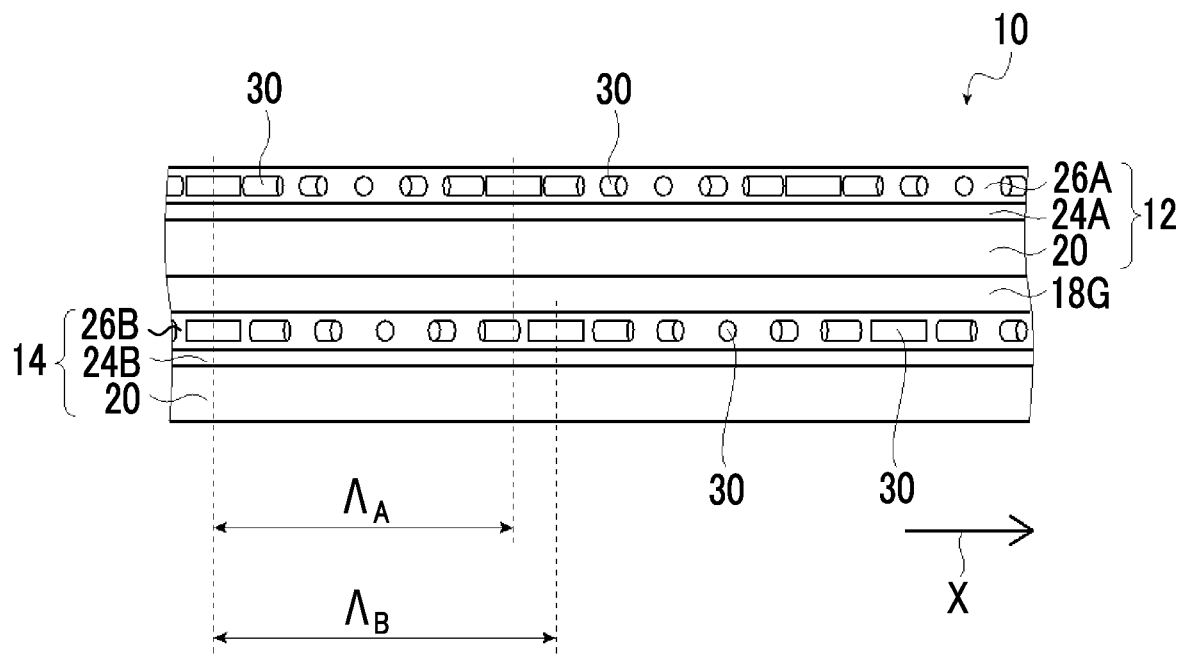
FIG. 1 is a diagram conceptually showing an example of an optical element according to the present invention.

Hereinafter, an optical element and a light guide element according to an embodiment of the present invention will be described in detail based on a preferable embodiment shown in the accompanying drawings.

In this specification, numerical ranges represented by "to" include numerical values before and after "to" as lower limit values and upper limit values.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

In this specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, $Re(\lambda)$ represents an in-plane retardation at a wavelength $\lambda$. Unless specified otherwise, the wavelength) refers to 550 nm.

In this specification, $Re(\lambda)$ is a value measured at the wavelength $\lambda$ using AxoScan (manufactured by Axometrics, Inc.). By inputting an average refractive index $((nx+ny+nz)/3)$ and a thickness (d (μm)) to AxoScan, the following expressions can be calculated.

Slow Axis Direction (°)

$Re(\lambda)=R0(\kappa)$

R0(k) is expressed as a numerical value calculated by AxoScan and represents $Re(\lambda)$.

An optical element according to the embodiment of the present invention includes: a plurality of optically-anisotropic layers that are formed using a composition including a liquid crystal compound, have a liquid crystal alignment pattern in which a direction of an optical axis derived from the liquid crystal compound changes while continuously rotating in at least one in-plane direction, and are arranged in a thickness direction; and a wavelength selective phase difference layer that is disposed between at least one pair of two optically-anisotropic layers adjacent to each other in an arrangement direction. That is, the thickness direction is a direction perpendicular to a main surface. The main surface is the maximum surface of a sheet-shaped material (a film or a plate-shaped material).

Here, the wavelength selective phase difference layer is a layer that converts circularly polarized light in a specific wavelength range into circularly polarized light having an opposite turning direction. For example, in a case where the wavelength selective phase difference layer converts circularly polarized light of red light into circularly polarized light having an opposite turning direction, right circularly polarized light of green light and right circularly polarized light of blue light transmit through the wavelength selective phase difference layer as right circularly polarized light.

In addition, in the optical element according to the embodiment of the present invention, in a case where, in the liquid crystal alignment pattern of the optically-anisotropic layer, a length over which the direction of the optical axis derived from the liquid crystal compound rotates by 180° in the in-plane direction in which the direction of the optical axis derived from the liquid crystal compound changes while continuously rotating is set as a single period, a length of the single period in at least one optically-anisotropic layer is different from that of another optically-anisotropic layer.

Although described below in detail, the optical element according to the embodiment of the present invention has the above-described configuration such that a wavelength dependence of a refraction angle of incident and transmitted light is small, and light components having different wavelengths incident from the same direction can be emitted substantially in the same direction.

[First Aspect of Optical Element]

FIG. 1 is a diagram conceptually showing an example of the optical element according to the embodiment of the present invention.

An optical element 10 shown in the drawing includes a first optically-anisotropic member 12, a second optically-anisotropic member 14, and a wavelength selective phase difference layer 18G that is disposed between the first optically-anisotropic member 12 and the second optically-anisotropic member 14.

As described above, in the optical element according to the embodiment of the present invention, a plurality of optically-anisotropic layers that are formed using a composition including a liquid crystal compound and have a predetermined liquid crystal alignment pattern in which an optical axis derived from the liquid crystal compound rotate are arranged in a thickness direction. The first optically-anisotropic member 12 includes a support 20, an alignment film 24A, and a first optically-anisotropic layer 26A. In addition, the second optically-anisotropic member 14 includes a support 20, an alignment film 24B, and a second optically-anisotropic layer 26B.

In addition, in the optical element according to the embodiment of the present invention, the wavelength selective phase difference layer converts circularly polarized light in a specific wavelength range into circularly polarized light having an opposite turning direction and allows transmission (passage) of the other light as it is. In the optical element 10 shown in the drawing, the wavelength selective phase difference layer 18G converts a turning direction of circularly polarized light of green light into an opposite turning direction and allows transmission of the other light as circularly polarized light having the same turning direction.

Although not shown in the drawing, the first optically-anisotropic member 12 and the wavelength selective phase difference layer 18G, and the wavelength selective phase difference layer 18G and the second optically-anisotropic member 14 are bonded to each other through bonding layers provided therebetween, respectively.

In the present invention, as the bonding layer, any layer consisting of one of various well-known materials can be used as long as it is a layer that can bond materials as bonding targets. The bonding layer may be a layer consisting of an adhesive that has fluidity during bonding and is solid after bonding, a layer consisting of a pressure sensitive adhesive that is a gel-like (rubber-like) flexible solid during bonding and of which the gel state does not change after bonding, or a layer consisting of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the first optically-anisotropic member 12, the wavelength selective phase difference layer 18G, and the second optically-anisotropic member 14 may be laminated and held by a frame, a holding device, or the like to configure the optical element according to the embodiment of the present invention.

The optical element according to the embodiment of the present invention is not limited to the configuration in which the first optically-anisotropic member 12, the wavelength selective phase difference layer 18G, and the second optically-anisotropic member 14 are laminated in contact with each other as in the example shown in the drawing, and may adopt a configuration in which the members are arranged in a state where one or more members are spaced from each other.

In addition, the optical element 10 shown in the drawing includes the support 20 for each of the optically-anisotropic members. However, the optical element according to the embodiment of the present invention does not necessarily include the support 20 for each of the optically-anisotropic members.

For example, the optical element according to the embodiment of the present invention may have a configuration in which the wavelength selective phase difference layer 18G is formed on a surface of the second optically-anisotropic member 14 (second optically-anisotropic layer 26B), the alignment film 24A is formed on a surface thereon, and the first optically-anisotropic layer 26A is formed thereon.

Alternatively, the support 20 of the second optically-anisotropic member 14 may be peeled off from the above-described configuration such that only the wavelength selective phase difference layer, the alignment film, and the optically-anisotropic layers configure the optical element according to the embodiment of the present invention. In addition, the alignment film may be peeled off from the above-described configuration such that only the wavelength selective phase difference layer and the optically-anisotropic layers configure the optical element according to the embodiment of the present invention.

That is, in the optical element according to the embodiment of the present invention, various layer configurations can be used as long as a plurality of optically-anisotropic layers are arranged, a wavelength selective phase difference layer is disposed between at least one pair of two optically-anisotropic layers adjacent to each other among the arranged optically-anisotropic layers, the optically-anisotropic layer has a liquid crystal alignment pattern in which a direction of an optical axis derived from a liquid crystal compound rotates in one in-plane direction, and the liquid crystal alignment pattern of at least one optically-anisotropic layer has different single periods described below.

<Optically-Anisotropic Member>

In the optical element 10 according to the embodiment of the present invention, the wavelength selective phase difference layer 18G is provided between the first optically-anisotropic member 12 and the second optically-anisotropic member 14.

As described above, the first optically-anisotropic member 12 includes the support 20, the alignment film 24A, and the first optically-anisotropic layer 26A. In addition, the second optically-anisotropic member 14 includes the support 20, the alignment film 24B, and the second optically-anisotropic layer 26B.

<<Support>>

In the first optically-anisotropic member 12 and the second optically-anisotropic member 14, the supports 20 support the alignment films 24A and 24B and the first and second optically-anisotropic layers 26A and 26B, respectively.

In the following description, in a case where it is not necessary to distinguish between the alignment films 24A and 24B, the alignment films 24A and 24B will also be collectively referred to as "alignment film". In addition, in the following description, in a case where it is not necessary to distinguish between the first and second optically-anisotropic layers 26A and 26B, the first and second optically-anisotropic layers 26A and 26B will also be collectively referred to as "optically-anisotropic layer".

As the support 20, various sheet-shaped materials (films or plate-shaped materials) can be used as long as they can support the alignment film and the optically-anisotropic layer.

As the support 20, a transparent support is preferable, and examples thereof include a polyacrylic resin film such as polymethyl methacrylate, a cellulose resin film such as cellulose triacetate, a cycloolefin polymer film (for example, trade name "ARTON", manufactured by JSR Corporation; or trade name "ZEONOR", manufactured by Zeon Corporation), polyethylene terephthalate (PET), polycarbonate, and polyvinyl chloride. The support is not limited to a flexible film and may be a non-flexible substrate such as a glass substrate.

The thickness of the support 20 is not particularly limited and may be appropriately set depending on the use of the optical element 10, a material for forming the support 20, and the like in a range where the alignment film and the optically-anisotropic layer can be supported.

The thickness of the support 20 is preferably 1 to 1000 μm, more preferably 3 to 250 μm, and still more preferably 5 to 150 μm.

<Alignment Film>

In the first optically-anisotropic member 12, the alignment film 24A is formed on the surface of the support 20. In the second optically-anisotropic member 14, the alignment film 24B is formed on the surface of the support 20.

The alignment film 24A is an alignment film for aligning the liquid crystal compound 30 to a predetermined liquid crystal alignment pattern during the formation of the first optically-anisotropic layer 26A of the first optically-anisotropic member 12. The alignment film 24B is an alignment film for aligning the liquid crystal compound 30 to a predetermined liquid crystal alignment pattern during the formation of the second optically-anisotropic layer 26B of the second optically-anisotropic member 14.

Although described below, in the optical element 10 according to the embodiment of the present invention, the optically-anisotropic layer has a liquid crystal alignment pattern in which a direction of an optical axis 30A (refer to FIG. 3) derived from the liquid crystal compound 30 changes while continuously rotating in one in-plane direction (arrow X direction described below). Accordingly, the alignment film of each of the optically-anisotropic members is formed such that the optically-anisotropic layer can form the liquid crystal alignment pattern.

In the optical element according to the embodiment of the present invention, in a case where a length over which the direction of the optical axis 30A rotates by 180° in the in-plane direction in which the direction of the optical axis 30A changes while continuously rotating in the liquid crystal alignment pattern is set as a single period (a rotation period of the optical axis), a length of the single period of the liquid crystal alignment pattern in at least one optically-anisotropic layer is different from that of another optically-anisotropic layer. In the optical element 10 shown in FIG. 1, a single period (single period $A_A$) of the liquid crystal alignment pattern in the first optically-anisotropic layer 26A is shorter than a single period (single period AB) of the liquid crystal alignment pattern in the second optically-anisotropic layer 26B.

In the following description, "the direction of the optical axis 30A rotates" will also be referred to as "the optical axis 30A rotates".

As the alignment film, various well-known films can be used.

Examples of the alignment film include a rubbed film consisting of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate (cinnamic acid) compound, a chalcone compound, or a phosphorus compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking ester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 11:
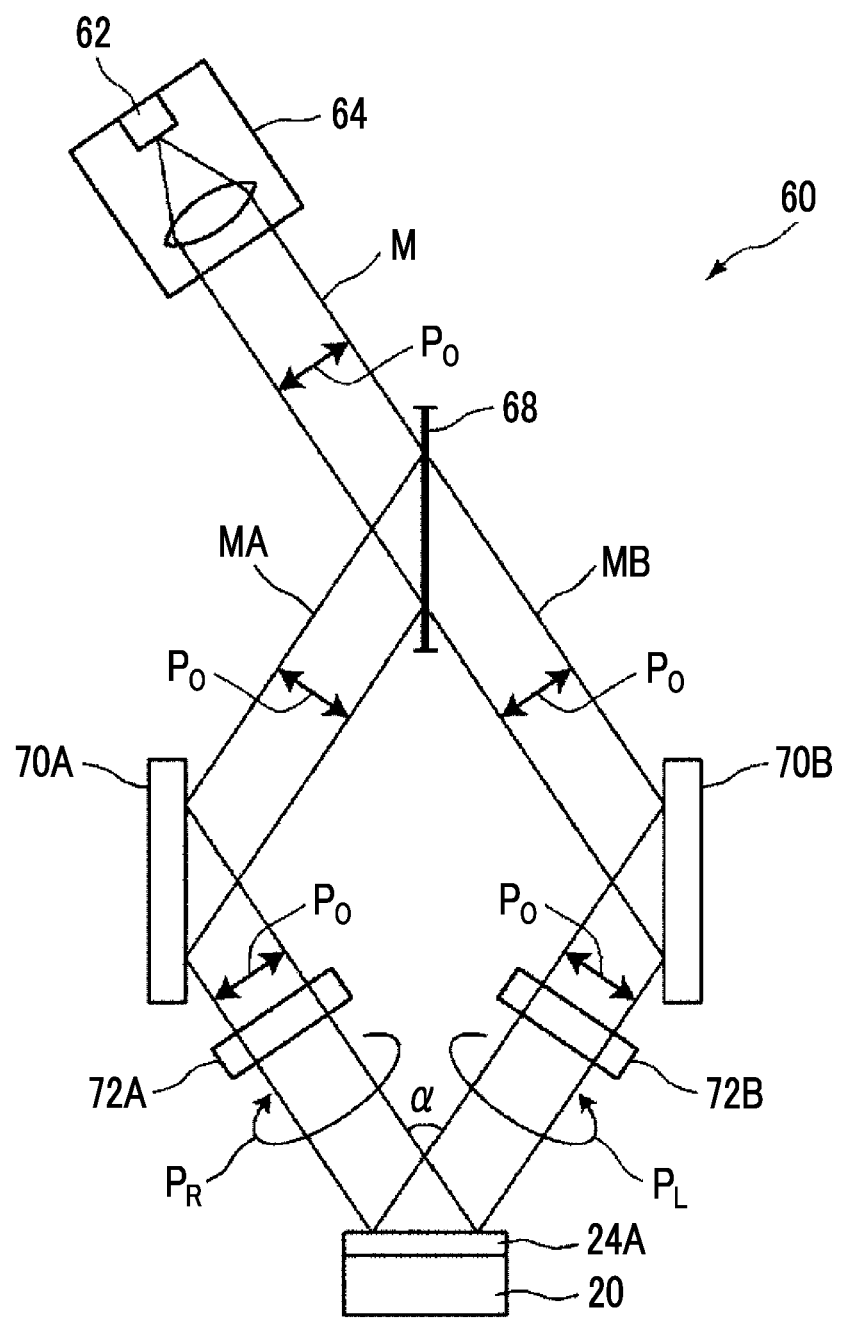
FIG. 11 is a diagram conceptually showing one example of an exposure device that exposes an alignment film of the optical element shown in FIG. 1.

FIG. 11 conceptually shows an example of an exposure device that exposes the alignment film to form an alignment pattern. In the example shown in FIG. 11, for example, the exposure of the alignment film 24A of the first optically-anisotropic member 12 is shown. The alignment film 24B of the second optically-anisotropic member 14 can also form the alignment pattern as in the exposure device.

An exposure device 60 shown in FIG. 11 includes: a light source 64 that includes a laser 62; a beam splitter 68 that splits laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 includes a polarizing plate and emits linearly polarized light $P_0$. The λ/4 plates 72A and 72B has optical axes perpendicular to each other. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 20 including the alignment film 24A on which the alignment pattern is not yet formed is disposed at an exposed portion, the two beams MA and MB intersect and interfere each other on the alignment film 24A, and the alignment film 24A is irradiated with and exposed to the interference light.

Due to the interference at this time, the polarization state of light with which the alignment film 24A is irradiated periodically changes according to interference fringes. As a result, in the alignment film 24A, an alignment pattern in which the alignment state periodically changes can be obtained.

In the exposure device 60, by changing an intersection angle α between the two beams MA and MB, the period of the alignment pattern can be adjusted. That is, by adjusting the intersection angle α in the exposure device 60, in the crystal alignment pattern in which the optical axis 30A derived from the liquid crystal compound 30 continuously rotates in the in-plane direction, the length A (single period A) of the single period over which the optical axis 30A rotates by 180° in the in-plane direction in which the optical axis 30A rotates can be adjusted.

By forming the optically-anisotropic layer on the alignment film having the alignment pattern in which the alignment state periodically changes, as described below, the first optically-anisotropic layer 26A having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

In the optical element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the first optically-anisotropic layer 26A or the like has the liquid crystal alignment pattern in which the direction of the optical axis 30A derived from the liquid crystal compound 30 changes while continuously rotating in at least one in-plane direction.

<<Optically-Anisotropic Layer>>

In the first optically-anisotropic member 12, the first optically-anisotropic layer 26A is formed on the surface of the alignment film 24A. In the second optically-anisotropic member 14, the second optically-anisotropic layer 26B is formed on the surface of the alignment film 24B.

Figure 2:
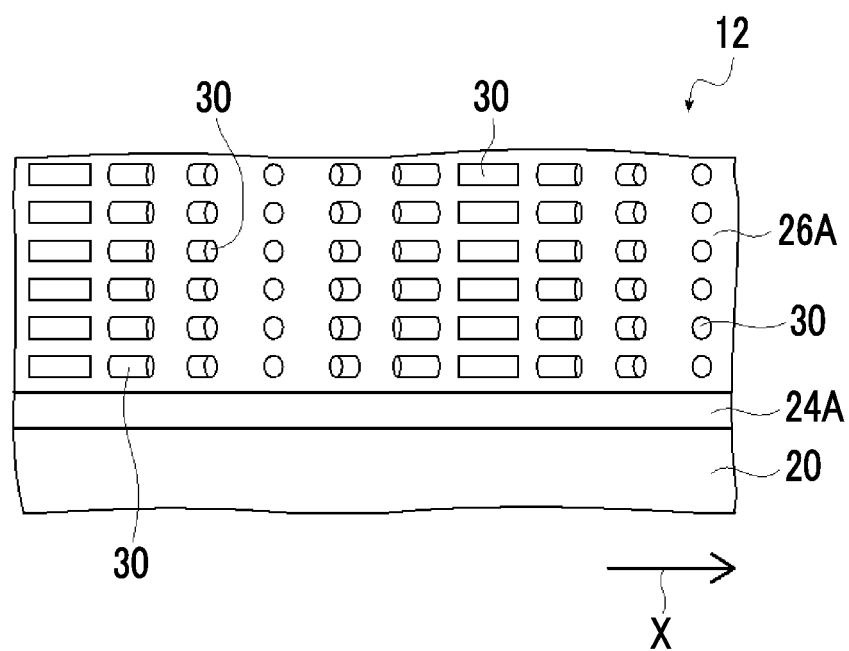
FIG. 2 is a diagram conceptually showing an optically-anisotropic layer of the optical element shown in FIG. 1.

In FIG. 1 (and FIGS. 4 to 6 described below), in order to simplify the drawing and to clarify the configuration of the optical element 10, only the liquid crystal compound 30 (liquid crystal compound molecules) on the surface of the alignment film in the first optically-anisotropic layer 26A and the second optically-anisotropic layer 26B is shown. However, as conceptually shown in FIG. 2 showing the first optically-anisotropic layer 26A, the first optically-anisotropic layer 26A and the second optically-anisotropic layer 26B have a structure in which the aligned liquid crystal compounds 30 are laminated as in an optically-anisotropic layer that is formed using a composition including a typical liquid crystal compound.

As described above, in the optical element 10 according to the embodiment of the present invention, the optically-anisotropic layer (the first optically-anisotropic layer 26A and the second optically-anisotropic layer 26B) is formed using the composition including the liquid crystal compound.

In a case where an in-plane retardation value is set as λ/2, the optically-anisotropic layer has a function of a general λ/2 plate, that is, a function of imparting a phase difference of a half wavelength, that is, 180° to two linearly polarized light components that are included in light incident into the optically-anisotropic layer and are perpendicular to each other.

The optically-anisotropic layer has the liquid crystal alignment pattern in which the direction of the optical axis derived from the liquid crystal compound changes while continuously rotating in one direction indicated by arrow X in a plane of the optically-anisotropic layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction.

In the following description, "one direction indicated by arrow X" will also be simply referred to as "arrow X direction". In addition, in the following description, the optical axis 30A derived from the liquid crystal compound 30 will also be referred to as "the optical axis 30A of the liquid crystal compound 30" or "the optical axis 30A".

In each of the optically-anisotropic layer, the liquid crystal compound 30 is two-dimensionally arranged in a plane parallel to the arrow X direction and in a Y direction perpendicular to the arrow X direction. In FIGS. 1 and 2 and FIGS. 4 to 6 described below, the Y direction is a direction perpendicular to the paper plane.

Figure 3:
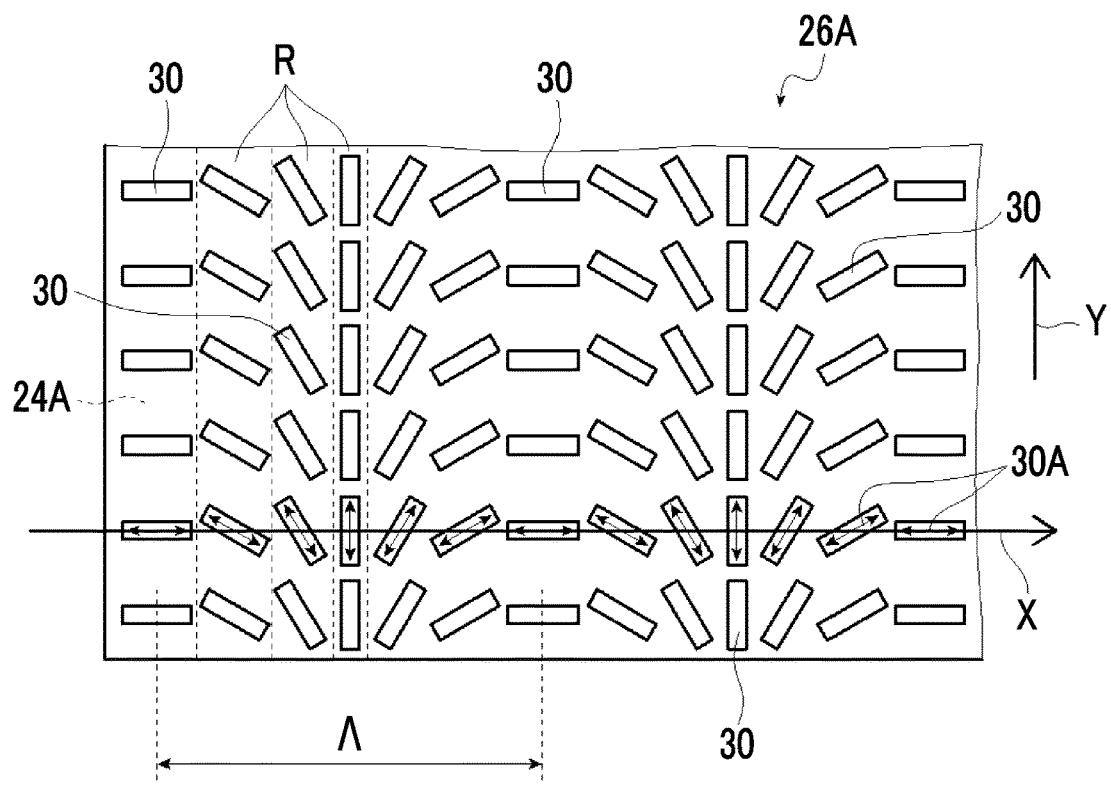
FIG. 3 is a plan view showing the optically-anisotropic layer of the optical element shown in FIG. 1.

FIG. 3 conceptually shows a plan view of the first optically-anisotropic layer 26A.

The plan view is a view in a case where the optical element 10 is seen from the top in FIG. 1, that is, a view in a case where the optical element 10 is seen from a thickness direction. In other words, the plan view is a view in a case where the first optically-anisotropic layer 26A is seen from a direction perpendicular to a main surface. In other words, the thickness direction of the optical element 10 is a laminating direction of the respective layers (films).

In addition, in FIG. 3, in order to clarify the configuration of the optical element 10 according to the embodiment of the present invention, only the liquid crystal compound 30 on the surface of the alignment film 24A is shown as in FIG. 1. However, in the thickness direction, as shown in FIG. 2, the first optically-anisotropic layer 26A has the structure in which the liquid crystal compound 30 is laminated on the surface of the alignment film 24A as described above.

In FIG. 3, the first optically-anisotropic layer 26A will be described as a representative example. However, basically, the second optically-anisotropic layer 26B also have the same configuration and the same effects as those of the first optically-anisotropic layer 26A, the lengths (single periods Λ) of the single periods of the liquid crystal alignment patterns described below are different from each other.

The rotation directions of the directions of the optical axes 30A in the first optically-anisotropic layer 26A and the second optically-anisotropic layer 26B are opposite to each other. That is, in a case where the rotation of the direction of the optical axis 30A in the first optically-anisotropic layer 26A is clockwise, the rotation of the direction of the optical axis 30A in the second optically-anisotropic layer is counterclockwise.

The first optically-anisotropic layer 26A has the liquid crystal alignment pattern in which the direction of the optical axis 30A derived from the liquid crystal compound 30 changes while continuously rotating in the arrow X direction in a plane of the first optically-anisotropic layer 26A.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, regarding the liquid crystal compound 30 forming the first optically-anisotropic layer 26A, the liquid crystal compounds 30 having the same direction of the optical axes 30A are arranged at regular intervals in the Y direction perpendicular to the arrow X direction, that is, the Y direction perpendicular to the in-plane direction in which the optical axis 30A continuously rotates.

In other words, regarding the liquid crystal compound 30 forming the first optically-anisotropic layer 26A, in the liquid crystal compounds 30 arranged in the Y direction, angles between the angles of the optical axes 30A and the arrow X direction are the same.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the direction of the optical axis 30A changes while continuously rotating is the length Λ of the single period in the liquid crystal alignment pattern. In other words, the length of the single period in the liquid crystal alignment pattern is defined as the distance between θ and θ+180° that is a range of the angle between the optical axis 30A of the liquid crystal compound 30 and the arrow X direction.

That is, a distance between centers of two liquid crystal compounds 30 in the arrow X direction is the length Λ of the single period, the two liquid crystal compounds having the same angle in the arrow X direction. Specifically, as shown in FIG. 3, a distance of centers of two liquid crystal compounds 30 in which the arrow X direction and the direction of the optical axis 30A in the arrow X direction is the length Λ of the single period. In the following description, the length Λ of the single period will also be referred to as "single period Λ".

In addition, in the following description, in order to distinguish between the single periods Λ of the respective optically-anisotropic layers, the single period Λ of the first optically-anisotropic layer 26A will also be referred to as "$\Lambda_A$", and the single period Λ of the second optically-anisotropic layer 26B will also be referred to as "$\Lambda_B$".

In the optical element 10 according to the embodiment of the present invention, in the liquid crystal alignment pattern of the optically-anisotropic layer, the single period Λ is repeated in the arrow X direction, that is, in the in-plane direction in which the direction of the optical axis 30A changes while continuously rotating.

As described above, in the liquid crystal compounds arranged in the Y direction in the optically-anisotropic layer, the angles between the optical axes 30A and the arrow X direction (the in-plane direction in which the direction of the optical axis of the liquid crystal compound 30 rotates) are the same. Regions where the liquid crystal compounds 30 in which the angles between the optical axes 30A and the arrow X direction are the same are arranged in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the above-described optically-anisotropic layer (the first optically-anisotropic layer 26A and the second optically-anisotropic layer 26B, the light is refracted such that the direction of the circularly polarized light is converted.

Figure 4:
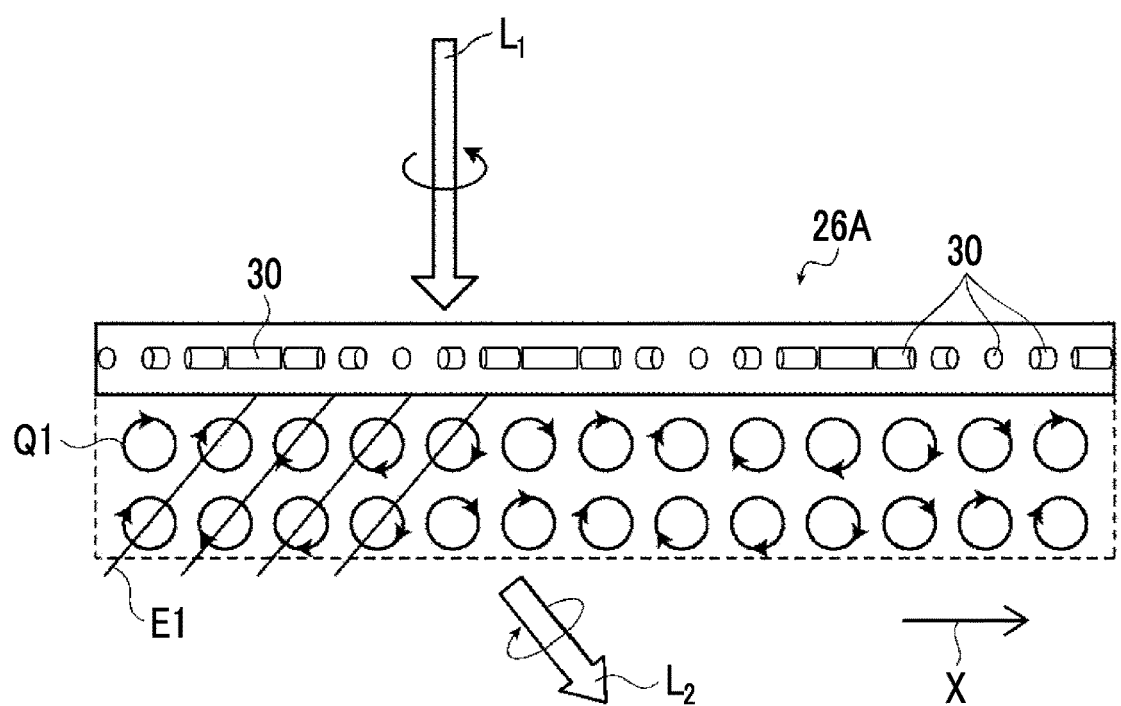
FIG. 4 is a conceptual diagram showing the action of the optically-anisotropic layer of the optical element shown in FIG. 1.

This action is conceptually shown in FIG. 4 using the first optically-anisotropic layer 26A. In the first optically-anisotropic layer 26a, the value of the product of the difference in refractive index of the liquid crystal compound and the thickness of the optically-anisotropic layer is λ/2.

As shown in FIG. 4, in a case where the value of the product of the difference in refractive index of the liquid crystal compound and the thickness of the optically-anisotropic layer in the first optically-anisotropic layer 26A is λ/2 and incidence light $L_1$ as left circularly polarized light is incident into the first optically-anisotropic layer 26A, the incidence light $L_1$ transmits through the first optically-anisotropic layer 26A to be imparted with a phase difference of 180° such that the transmitted light $L_2$ is converted into right circularly polarized light.

In addition, in a case where the incidence light $L_1$ transmits through the first optically-anisotropic layer 26A, an absolute phase thereof changes depending on the direction of the optical axis 30A of each of the liquid crystal compounds 30. At this time, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the first optically-anisotropic layer 26A is a pattern that is periodic in the arrow X direction. Therefore, as shown in FIG. 4, the incidence light $L_1$ transmitted through the first optically-anisotropic layer 26A is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and advances in a direction different from an advancing direction of the incidence light $L_1$. This way, the incidence light $L_1$ of the left circularly polarized light $P_L$ is converted into the transmitted light $L_2$ of right circularly polarized light that is tilted by a predetermined angle in the arrow X direction with respect to an incidence direction.

Figure 5:
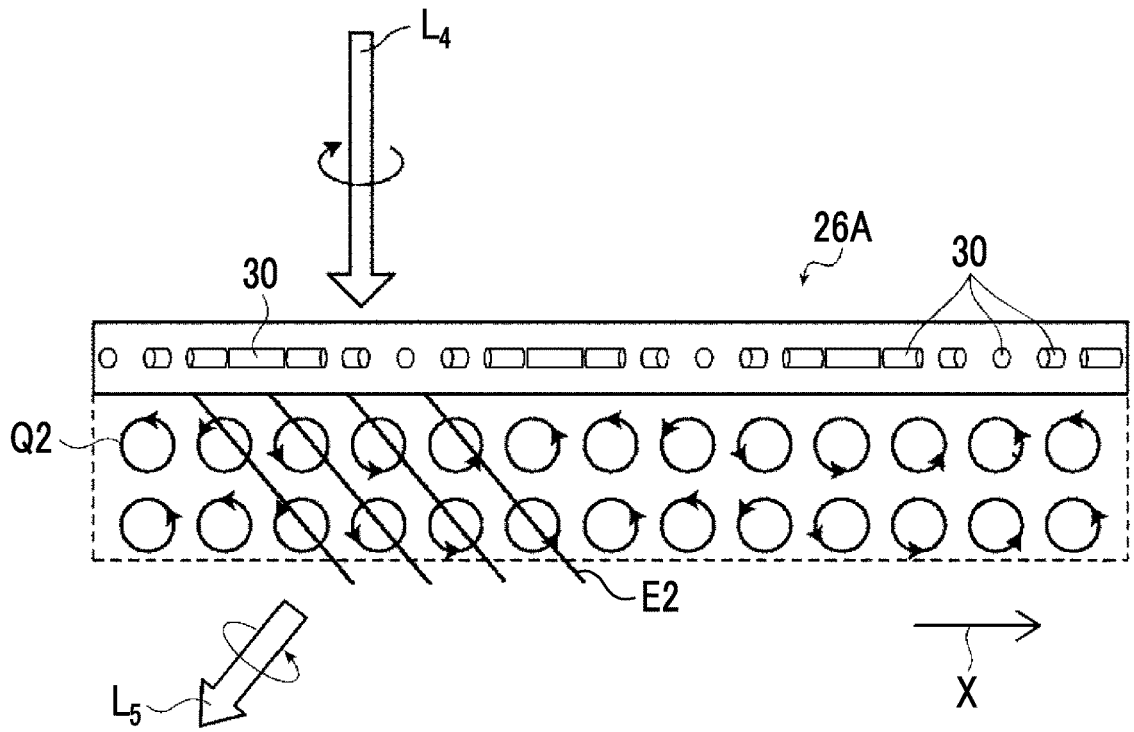
FIG. 5 is a conceptual diagram showing the action of the optically-anisotropic layer of the optical element shown in FIG. 1.

On the other hand, as conceptually shown in FIG. 5, in a case where the value of the product of the difference in refractive index of the liquid crystal compound and the thickness of the optically-anisotropic layer in the first optically-anisotropic layer 26A is λ/2 and incidence light $L_4$ as right circularly polarized light is incident into the first optically-anisotropic layer 26A, the incidence light $L_4$ transmits through the first optically-anisotropic layer 26A to be imparted with a phase difference of 180° and is converted into transmitted light $L_5$ of left circularly polarized light.

In addition, in a case where the incidence light $L_4$ transmits through the first optically-anisotropic layer 26A, an absolute phase thereof changes depending on the direction of the optical axis 30A of each of the liquid crystal compounds 30. At this time, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the first optically-anisotropic layer 26A is a pattern that is periodic in the arrow X direction. Therefore, as shown in FIG. 5, the incidence light $L_4$ transmitted through the first optically-anisotropic layer 26A is imparted with an absolute phase Q2 that is periodic in the arrow X direction corresponding to the direction of each of the optical axes 30A.

Here, the incidence light $L_4$ is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and advances in a direction different from an advancing direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

In the first optically-anisotropic layer 26A, it is preferable that the in-plane retardation value of the plurality of regions R is a half wavelength. It is preferable that an in-plane retardation $Re(550)=\Delta n_{550} \times d$ of the plurality of regions R of the first optically-anisotropic layer 26A with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the first optically-anisotropic layer 26A.

$$200 \text{ nm} \leq \Delta n_{550} \times d \leq 350 \text{ nm} \tag{1}$$

That is, in a case where the in-plane retardation $Re(550)=\Delta n_{550} \times d$ of the plurality of regions R of the first optically-anisotropic layer 26A satisfies Expression (1), a sufficient amount of a circularly polarized light component in light incident into the first optically-anisotropic layer 26A can be converted into circularly polarized light that advances in a direction tilted in a forward direction or reverse direction with respect to the arrow X direction. It is more preferable that the in-plane retardation $Re(550)=\Delta n_{550} \times d$ satisfies 225 nm $\leq \Delta n_{550} \times d \leq$ 340 nm, and it is still more preferable that the in-plane retardation $Re(550)=\Delta n_{550} \times d$ satisfies 250 nm $\leq \Delta n_{550} \times d \leq$ 330 nm.

Expression (1) is a range with respect to incidence light having a wavelength of 550 nm. However, an in-plane retardation $Re(\lambda)=\lambda m_\lambda \times d$ of the plurality of regions R of the optically-anisotropic layer with respect to incidence light having a wavelength of λ nm is preferably in a range defined by the following Expression (1-2) and can be appropriately set.

$$0.7\lambda \text{ nm} \leq \Delta n_\lambda \times d \leq 1.3\lambda \text{ nm} \tag{1-2}$$

In addition, the value of the in-plane retardation Re of the plurality of regions R of the first optically-anisotropic layer 26A in a range outside the range of Expression (1) can also be used. Specifically, by satisfying $\Delta n_{550} \times d < 200$ nm or 350 nm $< \Delta n_{550} \times d$, the light can be classified into light that advances in the same direction as an advancing direction of the incidence light and light that advances in a direction different from an advancing direction of the incidence light.

In a case where $\Delta n_{550} \times d$ approaches 0 nm or 550 nm, the amount of the light component that advances in the same direction as an advancing direction of the incidence light increases, and the amount of the light component that advances in a direction different from an advancing direction of the incidence light decreases.

Further, it is preferable that an in-plane retardation $Re(450)=\Delta n_{450} \times d$ of each of the plurality of regions R of the first optically-anisotropic layer 26A with respect to incidence light having a wavelength of 450 nm and an in-plane retardation $Re(550)=\Delta n_{550} \times d$ of each of the plurality of regions R of the first optically-anisotropic layer 26A with respect to incidence light having a wavelength of 550 nm satisfy the following Expression (2). Here, $\Delta n_{550}$ represents a difference in refractive index generated by refractive index anisotropy of the region R in a case where the wavelength of incidence light is 450 nm.

$$(\Delta n_{450} \times d)/(\Delta n_{550} \times d) < 1.0 \tag{2}$$

Expression (2) represents that the liquid crystal compound 30 included in the first optically-anisotropic layer 26A has reverse dispersibility. That is, by satisfying Expression (2), the first optically-anisotropic layer 26A can correspond to incidence light having a wide range of wavelength.

Here, by changing the single period Λ of the liquid crystal alignment pattern formed in the first optically-anisotropic layer 26A, refraction angles of the transmitted light components $L_2$ and $L_5$ can be adjusted. Specifically, as the single period Λ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 30a of the liquid crystal compound 30 that rotates in the arrow X direction, the refraction direction of transmitted light can be reversed.

The optically-anisotropic layer is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming an alignment film on the support 20, applying the liquid crystal composition to the alignment film, and curing the applied liquid crystal composition, the optically-anisotropic layer consisting of the cured layer of the liquid crystal composition can be obtained. Although the optically-anisotropic layer functions as a so-called λ/2 plate, the present invention also includes an aspect where a laminate including the support 20 and the alignment film that are integrated functions as a so-called λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, or an alignment assistant.

In addition, it is preferable that the optically-anisotropic layer has a wide range for the wavelength of incidence light and is formed of a liquid crystal material having a reverse birefringence dispersion. In addition, it is also preferable that the optically-anisotropic layer can be made to have a substantially wide range for the wavelength of incidence light by imparting a torsion component to the liquid crystal composition or by laminating different phase difference layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627A. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

Figure 15:
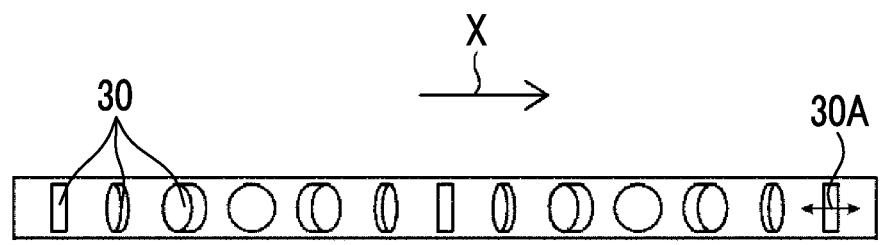
FIG. 15 is a diagram conceptually showing another example of the optically-anisotropic layer of the optical element according to the present invention.

In a case where the disk-shaped liquid crystal compound is used in the optically-anisotropic layer, the liquid crystal compound 30 rises in the thickness direction in the optically-anisotropic layer, and the optical axis 30A derived from the liquid crystal compound is defined as an axis perpendicular to a disk surface, that is so-called, a fast axis (refer to FIG. 15).

<Wavelength Selective Phase Difference Layer>

In the optical element 10 according to the embodiment of the present invention, the wavelength selective phase difference layer 18G is provided between the first optically-anisotropic member 12 and the second optically-anisotropic member 14.

In the optical element according to the embodiment of the present invention, the wavelength selective phase difference layer is a member that converts circularly polarized light in a specific wavelength range into circularly polarized light having an opposite turning direction.

In the optical element shown in the drawing, the wavelength selective phase difference layer 18G converts selectively circularly polarized light of green light into circularly polarized light having an opposite turning direction, converts right circularly polarized light of green light into left circularly polarized light of green light, converts left circularly polarized light of green light into right circularly polarized light of green light, and allows transmission (passage) of the other light in a state where the turning direction thereof is maintained.

In other words, the wavelength selective phase difference layer shifts only a phase in a specific wavelength range by π. The wavelength selective phase difference layer will also be referred to as, for example, a λ/2 plate that acts only in a specific wavelength range.

This wavelength selective phase difference layer can be prepared, for example, by laminating a plurality of phase difference plates having different phase differences.

As the wavelength selective phase difference layer, for example, a wavelength selective phase difference layer described in JP2000-510961A, SID 99 DIGEST, pp. 1072-1075, or the like can be used.

In the wavelength selective phase difference layer, a plurality of phase difference plates (phase difference layers) at different slow axis angles (slow axis directions) are laminated such that linearly polarized light in a specific wavelength range into linearly polarized light having an opposite turning direction. The plurality of phase difference plates are not limited to the configuration in which all the slow axis angles are different from each other. For example, a slow axis angle of at least one phase difference plate may be different from that of another phase difference plate.

It is preferable that at least one phase difference plate has forward dispersibility. In a case where at least one phase difference plate has forward dispersibility, by laminating a plurality of phase difference plates at different slow axis angles, a λ/2 plate that acts only in a specific wavelength range can be realized.

On the other hand, the wavelength selective phase difference layer described in JP2000-510961A, SID 99 DIGEST, pp. 1072-1075, or the like can selectively convert linearly polarized light into linearly polarized light having an opposite turning direction.

Here, in the present invention, the wavelength selective phase difference layer is a layer that converts circularly polarized light in a specific wavelength range into circularly polarized light having an opposite turning direction. Therefore, it is preferable that a λ/4 plate is provided on both surfaces of the wavelength selective phase difference layer described in JP2000-510961A, SID 99 DIGEST, pp. 1072-1075, or the like for use.

As the λ/4 plate, various phase difference plates, for example, a cured layer or a structural birefringence layer of a polymer or a liquid crystal compound can be used.

It is preferable that the λ/4 plate has reverse dispersibility. In a case where the λ/4 plate has reverse dispersibility, incidence light in a wide wavelength range can be handled.

As the λ/4 plate, a plurality of phase difference plates that are laminated to actually function as a λ/4 plate are preferably used. For example, a broadband λ/4 plate described in WO2013/137464A in which a λ/2 plate and a λ/4 plate are used in combination can handle with incidence light in a wide wavelength range and can be preferably used.

<Action of Optical Element>

As described above, the optically-anisotropic layer that is formed using the composition including the liquid crystal compound and has the liquid crystal alignment pattern in which the direction of the optical axis 30A rotates in the arrow X direction refracts circularly polarized light, in which a refraction angle varies depending on wavelengths of light. Specifically, as the wavelength of light increases, the refraction angle increases. Accordingly, for example, in a case where incidence light is red light, green light, and blue light, the red light is refracted to the highest degree, and the blue light is refracted to the lowest degree.

Therefore, for example, in a light guide plate of AR glasses, in a case where the optical element that includes the optically-anisotropic layer having the above-described liquid crystal alignment pattern in which the direction of the optical axis 30A rotates is used as a diffraction element for incidence and emission of light into and from the light guide plate, in the case of a full color image, an image having a so-called color shift in which reflection directions of red light, green light, and blue light are different from each other and a red image, a green image, and a blue image do not match each other is observed.

By providing a light guide plate for each of a red image, a green image, and a blue image as described in Bernard C. Kress et al., Towards the Ultimate Mixed Reality Experience: HoloLens Display Architecture Choices, SID 2017 DIGEST, pp. 127-131 and laminating the three light guide plates, the color shift can be resolved. However, in this configuration, as a whole, the light guide plate is thick and heavy. Further, the configuration is also complicated.

On the other hand, in the optical element according to the embodiment of the present invention, a plurality of optically-anisotropic layers are arranged, a wavelength selective phase difference layer is disposed between at least one pair of two optically-anisotropic layers adjacent to each other among the arranged optically-anisotropic layers, the optically-anisotropic layer has a liquid crystal alignment pattern in which a direction of an optical axis derived from a liquid crystal compound rotates in one in-plane direction, and a single period in the liquid crystal alignment pattern of at least one optically-anisotropic layer is different from that of another optically-anisotropic layer.

In the optical element according to the embodiment of the present invention, the wavelength dependence of a refraction angle of light is significantly reduced, light components having different wavelengths can be refracted to be transmitted and emitted substantially in the same direction. Therefore, by using the optical element according to the embodiment of the present invention (for example, an optical element 32 described below) as a diffraction element for incidence of light from a light guide plate and/or as a diffraction element for emission of light into a light guide plate, for example, in AR glasses, a red image, a green image, and a blue image can be propagated by one light guide plate without the occurrence of a color shift. As a result, an appropriate image can be displayed to a user.

Figure 6:
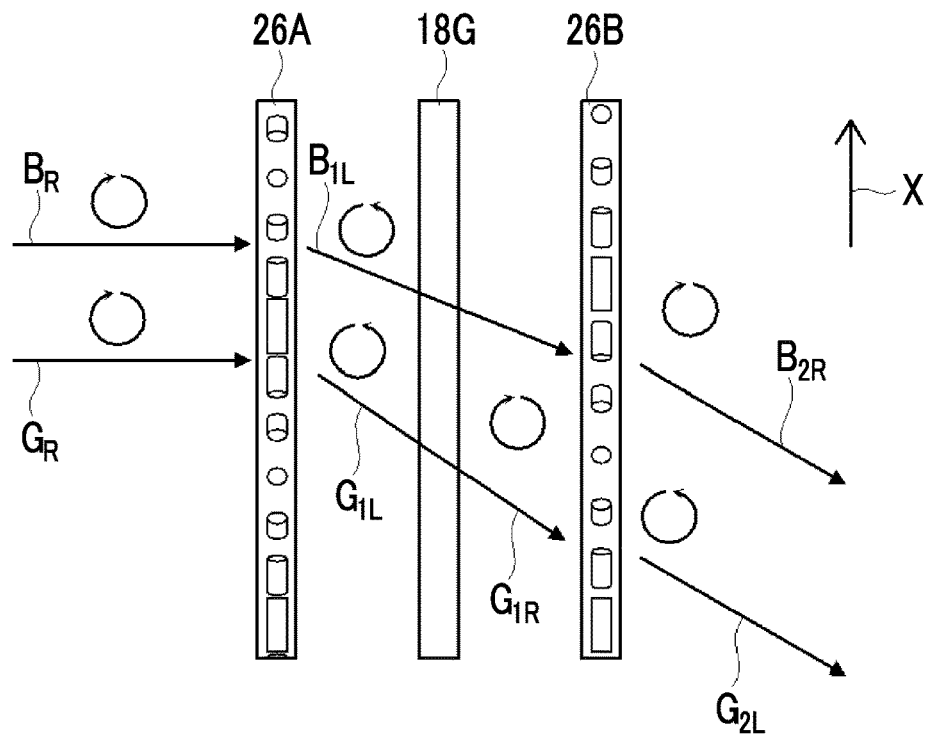
FIG. 6 is a conceptual diagram showing the action of the optical element shown in FIG. 1.

Hereinafter, the action of the optical element 10 will be described in detail with reference to the conceptual diagrams of FIGS. 6 and 7.

In the optical element according to the embodiment of the present invention, basically, only the optically-anisotropic layer and the wavelength selective phase difference layer exhibit an optical action. Therefore, in order to simplify the drawing and to clarify the configuration and the effects, in FIG. 6 (and FIG. 9 described below), only the first optically-anisotropic layer 26A and the second optically-anisotropic layer 26B in the first optically-anisotropic member 12 and the second optically-anisotropic member 14 are shown, and the members shown in the drawing are spaced from each other in the arrangement direction.

As described above, in the optical element 10, the wavelength selective phase difference layer 18G that converts a turning direction of circularly polarized light of green light into an opposite direction is provided between the first optically-anisotropic member 12 including the first optically-anisotropic layer 26A and the second optically-anisotropic member 14 including the second optically-anisotropic layer 26B.

For example, the optical element 10 refracts incidence light to be transmitted in a predetermined direction, the incidence light including circularly polarized light of blue light and circularly polarized light of green light. In FIG. 6, incidence light is right circularly polarized light. However, even in a case where incidence light is left circularly polarized light, the effects are the same, except that the refraction direction is reversed.

In the optical element 10, in a case where right circularly polarized light $G_R$ of green light and right circularly polarized light $B_R$ of blue light (refer to incidence light $L_4$ in FIG. 5) are incident into the first optically-anisotropic layer 26A, as described above, the right circularly polarized light $G_R$ of green light and the right circularly polarized light $B_R$ of blue light are refracted in a direction opposite to the arrow X direction at a predetermined angle with respect to the incidence direction and are converted into left circularly polarized light $G_{1L}$ of green light and left circularly polarized light $B_{1L}$ of blue light (refer to transmitted light $L_5$ in FIG. 5).

Here, as described above, the refraction angle of green light having a longer wavelength by the first optically-anisotropic layer 26A is more than that of blue light. Therefore, as shown in FIG. 7, regarding the refraction angle with respect to incidence light, an angle $\theta_{G1}$ of green light is more than an angle $\theta_{B1}$ of blue light (B). In addition, regarding the single period $\Lambda$ of the optically-anisotropic layer, the single period $\Lambda_4$ of the first optically-anisotropic layer 26A is shorter. Therefore, the refraction angle of each light is more than that of light transmitted through the second optically-anisotropic layer 26B.

Next, the left circularly polarized light $G_{1L}$ of green light and the left circularly polarized light $B_{1L}$ of blue light transmitted through the first optically-anisotropic layer 26A are incident into the wavelength selective phase difference layer 18G.

As described above, the wavelength selective phase difference layer 18G converts only the circularly polarized light of green light into circularly polarized light having an opposite turning direction and allows transmission (passage) of the other light in a state where the turning direction thereof is maintained.

Accordingly, in a case where the left circularly polarized light $G_{1L}$ of green light and the left circularly polarized light $B_{1L}$ of blue light are incident into and transmits through the wavelength selective phase difference layer 18G, the left circularly polarized light $B_{1L}$ of blue light transmits through the wavelength selective phase difference layer 18G as it is. On the other hand, the left circularly polarized light $G_{1L}$ of green light is converted into right circularly polarized light $G_{1R}$ of green light.

Next, the right circularly polarized light $G_{1R}$ of green light and the left circularly polarized light $B_{1L}$ of blue light transmitted through the wavelength selective phase difference layer 18G are incident into the second optically-anisotropic layer 26B.

The right circularly polarized light $G_{1R}$ of green light and the left circularly polarized light $B_{1L}$ of blue light incident into the second optically-anisotropic layer 26B are also refracted and converted into circularly polarized light having an opposite turning direction such that left circularly polarized light $G_{2L}$ of green light and right circularly polarized light $B_{2R}$ of blue light are emitted.

Here, turning directions of the right circularly polarized light $G_{1R}$ of green light and the left circularly polarized light $B_{1L}$ of blue light incident into the second optically-anisotropic layer 26B are opposite to each other. In addition, as described above, the rotation directions of the optical axes 30A of the liquid crystal compounds 30 in the first optically-anisotropic layer 26A and the second optically-anisotropic layer 26B are opposite to each other.

Figure 7:
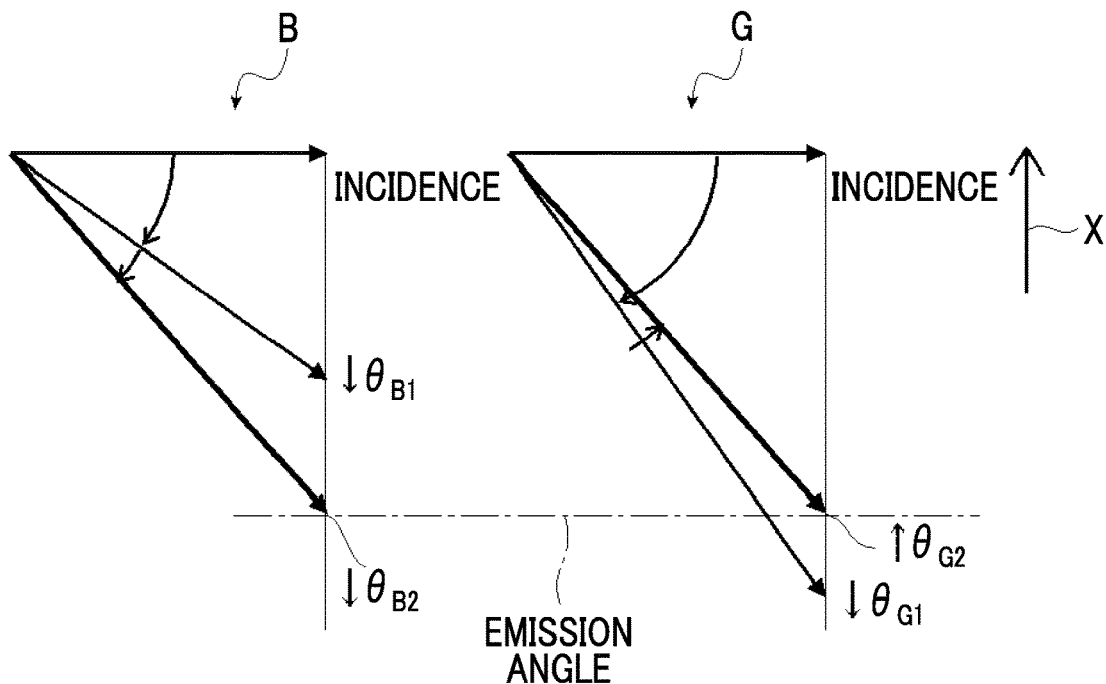
FIG. 7 is a conceptual diagram showing the action of the optical element shown in FIG. 1.

Therefore, as shown in FIGS. 4 and 5, the left circularly polarized light $B_{2L}$ of blue light is further refracted in a direction opposite to the arrow X direction and is emitted at an angle $\theta_{B2}$ with respect to the incidence light (the right circularly polarized light $B_R$ of blue light) as shown on the left side of FIG. 7.

On the other hand, the turning direction of the right circularly polarized light $G_{1R}$ of green light is opposite to that of blue light. Therefore, as shown on the right side of FIG. 7, in the second optically-anisotropic layer 26B, the light is refracted in the direction indicated by the arrow X that is opposite to that of the first optically-anisotropic layer 26A such that refraction returns to the original state. As a result, the left circularly polarized light $G_{2L}$ of green light is emitted at an angle $\theta_{G2}$ that is less than the initial angle $\theta_{G1}$ and substantially the same as the angle $\theta_{B2}$ of the left circularly polarized light $B_{2L}$ of blue light with respect to the incidence light (the right circularly polarized light $G_R$ of green light).

This way, in the optical element 10 according to the embodiment of the present invention, green light having a long wavelength and large refraction by the optically-anisotropic layer is refracted in a direction opposite to the arrow X direction in the first optically-anisotropic layer 26A and is refracted in the arrow X direction in the second optically-anisotropic layer 26B such that refraction returns to the original state. On the other hand, blue light having a short wavelength and small refraction by the optically-anisotropic layer is refracted in a direction opposite to the arrow X direction in the first optically-anisotropic layer 26A and the second optically-anisotropic layer 26B.

That is, in the optical element 10, depending on the magnitude of refraction by the optically-anisotropic layer derived from a wavelength, light having large refraction and a long wavelength is initially refracted and is secondly refracted in an opposite direction such that refraction returns to the initial state. On the other hand, light having small refraction and a short wavelength is secondly refracted in the same direction as that the direction in which the light is initially refracted. As a result, the refraction angle $\theta_{G2}$ of green light and the refraction angle $\theta_{B2}$ of blue light with respect to incidence light can be made to be very close to each other.

Therefore, in the optical element 10 according to the embodiment of the present invention, blue light and green light that are incident can be refracted at substantially the same angle to be emitted substantially in the same direction.

As described above, the refraction angles of light by the first optically-anisotropic layer 26A and the second optically-anisotropic layer 26B increase as the wavelength of the light increases.

In addition, the refraction angles of light by the first optically-anisotropic layer 26A and the second optically-anisotropic layer 26B increase as the length of the single period Λ over which the direction of optical axis 30A rotates by 180° in the arrow X direction in the liquid crystal alignment pattern decreases. In the optical element 10, for example, as shown in FIG. 1, the single period $\Lambda_A$ of the liquid crystal alignment pattern in the first optically-anisotropic layer 26A is shorter than the single period $\Lambda_B$ of the liquid crystal alignment pattern in the second optically-anisotropic layer 26B. That is, in the first optically-anisotropic layer 26A on the light incidence side, light is largely refracted.

Accordingly, by adjusting the single period Λ of the liquid crystal alignment pattern with respect to a wavelength of light as a target, emission directions of light components having different wavelengths can be suitably made to be the same.

In a case where light components having two wavelength ranges are targets as in the optical element 10 shown in the drawing, a designed wavelength of light having a long wavelength is represented by λa, a designed wavelength of light having a short wavelength is represented by λb (λa>λb), a single period of a liquid crystal alignment pattern in the first optically-anisotropic layer is represented by $\Lambda_1$, and a single period of a liquid crystal alignment pattern in the second optically-anisotropic layer is represented by $\Lambda_2$, emission directions of light components in two wavelength ranges can be made to be substantially the same by satisfying the following expression.

$$\Lambda_2=[(\lambda a+\lambda b)/(\lambda a-\lambda b)]\Lambda_1$$

In this expression, any one of the first optically-anisotropic layer 26A and the second optically-anisotropic layer 26B may be the first layer.

In consideration of this point, in the present invention, it is preferable that the following expression is satisfied in the optical element 10 in which light components having two wavelengths (wavelength ranges) are targets.

$$0.6*\{[(\lambda a+\lambda b)/(\lambda a-\lambda b)]\Lambda_1\}<\Lambda_2$$

$$<3.0*\{[(\lambda a+\lambda b)/(\lambda a-\lambda b)]\Lambda_1\}$$

As a result, by significantly reducing the wavelength dependence of refraction, emission directions of light components having two wavelength ranges can be made to be substantially the same.

In addition, in the present invention, it is more preferable that the following expression is satisfied in the optical element 10 in which light components having two wavelengths (wavelength ranges) are targets.

$$0.7*\{[(\lambda a+\lambda b)/(\lambda a-\lambda b)]\Lambda_1\}\leq\Lambda_2$$

$$<1.8*\{[(\lambda a+\lambda b)/(\lambda a-\lambda b)]\Lambda_1\}$$

It is still more preferable that the relationship satisfies the following expression.

$$0.8*\{[(\lambda a+\lambda b)/(\lambda a-\lambda b)]\Lambda_1\}\leq\Lambda_2$$

$$<1.3*\{[(\lambda a+\lambda b)/(\lambda a-\lambda b)]\Lambda_1\}$$

It is still more preferable that the relationship satisfies the following expression.

$$0.9*\{[(\lambda a+\lambda b)/(\lambda a-\lambda b)]\Lambda_1\}\leq\Lambda_2$$

$$<1.15*\{[(\lambda a+\lambda b)/(\lambda a-\lambda b)]\Lambda_1\}$$

[Second Aspect of Optical Element]

In the above-described optical element 10, light components having two wavelength ranges (designed wavelengths) including green light and blue light are targets. However, the optical element according to the embodiment of the present invention is not limited thereto, and incidence light including light components having three or more wavelength ranges may be refracted and emitted.

Figure 8:
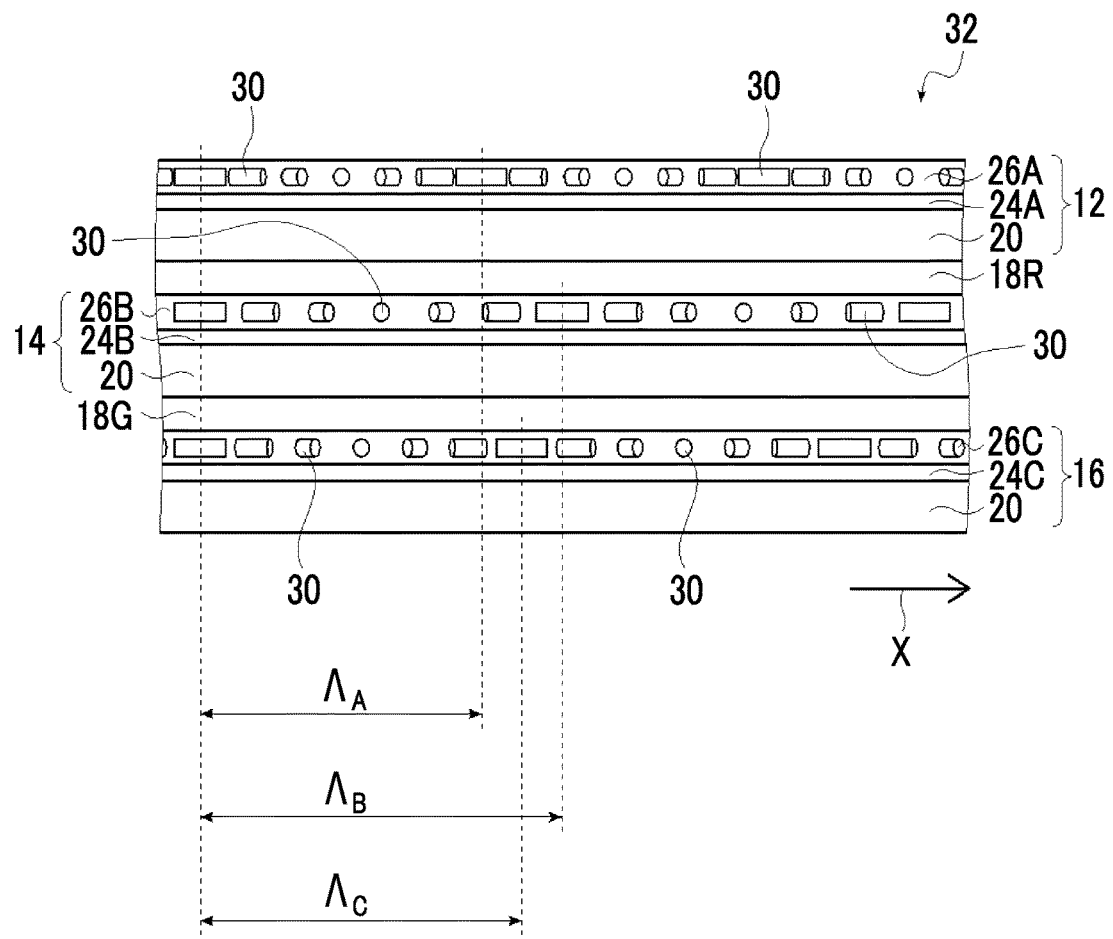
FIG. 8 is a diagram conceptually showing still another example of the optical element according to the present invention.

FIG. 8 shows an example of this optical element.

In the optical element 32 shown in FIG. 8, the same members as those of the optical element 10 shown in FIG. 1 are widely used. Therefore, the same members are represented by the same reference numerals, and different members will be mainly described below.

The optical element 32 shown in FIG. 8 further includes a third optically-anisotropic member 16 and a wavelength selective phase difference layer 18R in addition to the first optically-anisotropic member 12, the second optically-anisotropic member 14, and the wavelength selective phase difference layer 18G of the above-described optical element 10.

The third optically-anisotropic member 16 has the same configuration as that of the first optically-anisotropic member 12 or the like and includes the support 20, an alignment film 24C, and a third optically-anisotropic layer 26C. The alignment film 24C and the third optically-anisotropic layer 26C have the same configurations as those of the alignment film 24a and the first optically-anisotropic layer 26A described below, except for the single period Λ.

In addition, the wavelength selective phase difference layer 18R converts selectively circularly polarized light of red light into circularly polarized light having an opposite turning direction, converts right circularly polarized light of red light into left circularly polarized light of red light, converts left circularly polarized light of red light into right circularly polarized light of red light, and allows transmission of the other light as it is.

In the optical element 32, the rotation directions of the optical axes 30A of the liquid crystal compounds 30 in the arrow X direction of the first optically-anisotropic layer 26A and the third optically-anisotropic layer 26C are the same as each other, and the rotation direction of the optical axis 30A of the liquid crystal compound 30 in the arrow X direction of the second optically-anisotropic layer 26B is opposite to that of the other two optically-anisotropic layers.

In addition, in the optical element 32, regarding the length of the single period Λ over which the optical axis 30A of the liquid crystal compound 30 rotates by 180° in the arrow X direction in the liquid crystal alignment pattern, the single period $\Lambda_A$ of the first optically-anisotropic layer 26A is the shortest, and the single period $\Lambda_B$ of the second optically-anisotropic layer 26B is the longest. In the optical element 32, the first optically-anisotropic member 12 side is a light incidence side. That is, in the optical element 32, in the first optically-anisotropic layer 26A on the light incidence side, light is refracted to the highest degree.

Further, in the optical element 32, the wavelength selective phase difference layer 18R that selectively converts a turning direction of circularly polarized light of red light is disposed between the first optically-anisotropic member 12 (the first optically-anisotropic layer 26A) and the second optically-anisotropic member 14 (the second optically-anisotropic layer 26B). In addition, in the optical element 32, the wavelength selective phase difference layer 18g that selectively converts a turning direction of circularly polarized light of green light is disposed between the second optically-anisotropic member 14 and the third optically-anisotropic member 16 (the third optically-anisotropic layer 26C).

Hereinafter, the action of the optical element 32 will be described in detail with reference to the conceptual diagrams of FIGS. 9 and 10.

For example, the optical element 10 refracts incidence light to be transmitted in a predetermined direction, the incidence light including circularly polarized light of red light, circularly polarized light of green light, and circularly polarized light of blue light. In FIG. 9, incidence light is right circularly polarized light as in FIG. 6. However, even in a case where incidence light is left circularly polarized light, the effects are the same, except that the refraction direction is reversed.

In the optical element 10, in a case where right circularly polarized light $R_R$ of red light, right circularly polarized light $G_R$ of green light, and right circularly polarized light $B_R$ of blue light (refer to incidence light $L_4$ in FIG. 5) are incident into the first optically-anisotropic layer 26A, as described above, the right circularly polarized light $R_R$ of red light, the right circularly polarized light $G_R$ of green light, and the right circularly polarized light $B_R$ of blue light are refracted in a direction opposite to the arrow X direction at a predetermined angle with respect to the incidence direction and are converted into left circularly polarized light $R_{1L}$ of red light, left circularly polarized light $G_{1L}$ of green light, and left circularly polarized light $B_{1L}$ of blue light (refer to transmitted light $L_5$ in FIG. 5).

Here, as described above, regarding the refraction angle by the first optically-anisotropic layer 26A, the angle of red light having the longest wavelength is the largest, and the angle of blue light having the shortest wavelength is the smallest. Accordingly, regarding the refraction angle with respect to the incidence light, as shown in FIG. 7, an angle $\theta_{R1}$ of red light (R) is the largest, an angle $\theta_{G1}$ of green light (G) is intermediate, and an angle $\theta_{B1}$ of blue light (B) is the smallest. In addition, regarding the single period Λ of the optically-anisotropic layer, the single period $\Lambda_A$ of the first optically-anisotropic layer 26A is the shortest. Therefore, the refraction angle of each light transmitted through the first optically-anisotropic layer 26A is the largest.

Next, the left circularly polarized light $R_{1L}$ of red light, the left circularly polarized light $G_{1L}$ of green light, and the left circularly polarized light $B_{1L}$ of blue light transmitted through the first optically-anisotropic layer 26A are incident into the wavelength selective phase difference layer 18R.

As described above, the wavelength selective phase difference layer 18R converts only the circularly polarized light of red light into circularly polarized light having an opposite turning direction and allows transmission (passage) of the other light as it is.

Accordingly, in a case where the left circularly polarized light $R_{1L}$ of red light, the left circularly polarized light $G_{1L}$ of green light and the left circularly polarized light $B_{1L}$ of blue light are incident into and transmits through the wavelength selective phase difference layer 18R, the left circularly polarized light $G_{1L}$ of green light and the left circularly polarized light $B_{1L}$ of blue light transmit through the wavelength selective phase difference layer 18R as it is. On the other hand, the left circularly polarized light $R_{1L}$ of red light is converted into right circularly polarized light $R_{1R}$ of red light.

Next, the right circularly polarized light $R_{1R}$ of red light, the left circularly polarized light $G_{1L}$ of green light, and the left circularly polarized light $B_{1L}$ of blue light transmitted through the wavelength selective phase difference layer 18R are incident into the second optically-anisotropic layer 26B.

The right circularly polarized light $R_{1R}$ of red light, the left circularly polarized light $G_{1L}$ of green light, and the left circularly polarized light $B_{1L}$ of blue light incident into the second optically-anisotropic layer 26B are also refracted and converted into circularly polarized light having an opposite turning direction such that left circularly polarized light $R_{2L}$ of red light, right circularly polarized light $G_{2R}$ of green light, and right circularly polarized light $B_{2R}$ of blue light are emitted.

Here, the green light and the blue light incident into the second optically-anisotropic layer 26B are left circularly polarized light. On the other hand, the red light incident into the second optically-anisotropic layer 26B is right circularly polarized light having a direction of circularly polarized light that is converted by the wavelength selective phase difference layer 18R and is different from that of green light and blue light.

In addition, as described above, the rotation directions of the optical axes 30A of the liquid crystal compounds 30 in the first optically-anisotropic layer 26A and the second optically-anisotropic layer 26B are opposite to each other.

Figure 10:
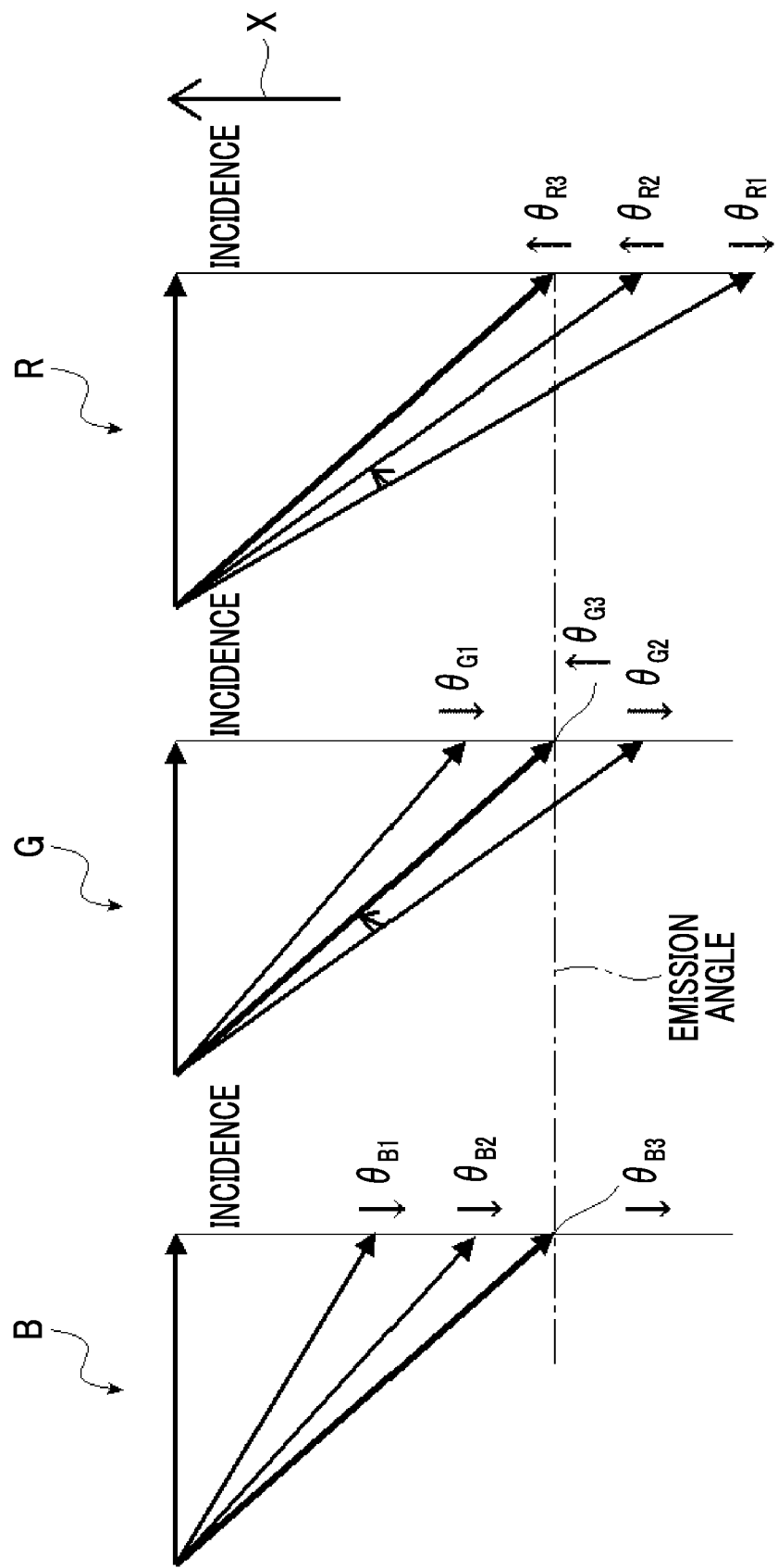

Therefore, as shown in FIGS. 4 and 5, the left circularly polarized light $G_{2L}$ of green light and the left circularly polarized light $B_{2L}$ of blue light incident into the second optically-anisotropic layer 26B are further refracted in a direction opposite to the arrow X direction and is emitted at the angle $\theta_{G2}$ and the angle $\theta_{B2}$ with respect to the incidence light (the right circularly polarized light $G_R$ of green light and the right circularly polarized light $B_R$ of blue light) as shown in FIG. 10.

On the other hand, the right circularly polarized light $R_{1R}$ of red light having a direction of circularly polarized light opposite to that of circularly polarized light incident into the second optically-anisotropic layer 26B is refracted in the arrow X direction that is opposite to that of the first optically-anisotropic layer 26A such that refraction returns to the initial state as shown on the right side of FIG. 10. As a result, the left circularly polarized light $R_{2L}$ of red light emitted from the second optically-anisotropic layer 26B is emitted at an angle $\theta_{R2}$ that is less than the angle $\theta_{R1}$ with respect to the incidence light (the right circularly polarized light $R_R$ of red light).

In addition, regarding the single period Λ of the optically-anisotropic layer, the single period $\Lambda_B$ of the second optically-anisotropic layer 26B is the longest. Therefore, the refraction angle of each light transmitted through the second optically-anisotropic layer 26B is the smallest.

Next, the left circularly polarized light $R_{2L}$ of red light, the right circularly polarized light $G_{2R}$ of green light, and the right circularly polarized light $B_{2R}$ of blue light transmitted through the second optically-anisotropic layer 26B are incident into the wavelength selective phase difference layer 18G.

As described above, the wavelength selective phase difference layer 18G converts only the circularly polarized light of green light into circularly polarized light having an opposite turning direction and allows transmission of the other light as it is.

Accordingly, in a case where the left circularly polarized light $R_{2L}$ of red light, the right circularly polarized light $G_{2R}$ of green light and the right circularly polarized light $B_{2R}$ of blue light are incident into and transmits through the wavelength selective phase difference layer 18G, the left circularly polarized light $R_{2L}$ of red light and the right circularly polarized light $B_{2R}$ of blue light transmit through the wavelength selective phase difference layer 18G as it is. On the other hand, the right circularly polarized light $G_{2R}$ of green light is converted into left circularly polarized light $G_{2L}$ of green light.

Next, the left circularly polarized light $R_{2L}$ of red light, the left circularly polarized light $G_{2L}$ of green light, and the right circularly polarized light $B_{2R}$ of blue light transmitted through the wavelength selective phase difference layer 18G are incident into the third optically-anisotropic layer 26C.

The left circularly polarized light $R_{2L}$ of red light, the left circularly polarized light $G_{2L}$ of green light, and the right circularly polarized light $B_{2R}$ of blue light incident into the third optically-anisotropic layer 26C are also refracted and converted into circularly polarized light having an opposite turning direction such that right circularly polarized light $R_{3R}$ of red light, right circularly polarized light $G_{3R}$ of green light, and left circularly polarized light $B_{3L}$ of blue light are emitted.

Here, the blue light incident into the third optically-anisotropic layer 26C is the right circularly polarized light $B_{2R}$ of blue light. In addition, the direction of circularly polarized light of red light is previously converted by the wavelength selective phase difference layer 18R. Therefore, the red light incident into the third optically-anisotropic layer 26C is the left circularly polarized light $R_{2L}$ of red light having a direction of circularly polarized light that is different from that of blue light. Further, the green light incident into the third optically-anisotropic layer 26C is the left circularly polarized light $G_{2L}$ of green light having a direction of circularly polarized light that is converted by the wavelength selective phase difference layer 18G.

That is, the blue light incident into the third optically-anisotropic layer 26C is right circularly polarized light, and the red light and the green light incident into the third optically-anisotropic layer 26C are left circularly polarized light having a direction of circularly polarized light that is converted by the wavelength selective phase difference layer.

In addition, as described above, the rotation directions of the optical axes 30A of the liquid crystal compounds 30 in the second optically-anisotropic layer 26B and the third optically-anisotropic layer 26C are opposite to each other.

Figure 9:
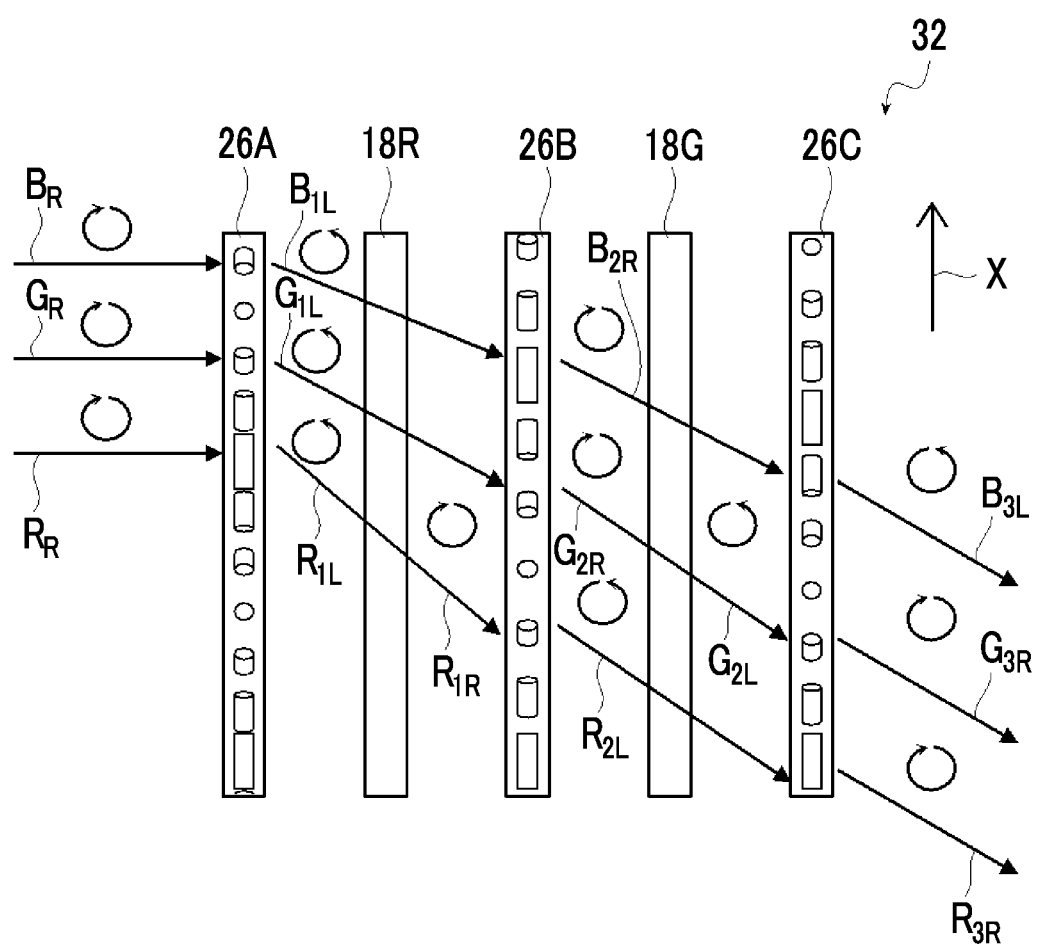
FIG. 9 is a conceptual diagram showing the action of the optical element shown in FIG. 8.

Therefore, as shown in FIGS. 9 and 10, the right circularly polarized light $B_{2R}$ of blue light incident into the third optically-anisotropic layer 26C is further refracted in a direction opposite to the arrow X direction and is emitted at an angle $\theta_{B3}$ with respect to the incidence light (the right circularly polarized light $B_R$ of blue light) as shown in FIG. 10.

On the other hand, in a case where the left circularly polarized light $R_{2L}$ of red light having an opposite direction of circularly polarized light is incident into the third optically-anisotropic layer 26C, the left circularly polarized light $R_{2L}$ of red light is further refracted to return to the arrow X direction. As a result, the right circularly polarized light $R_{3R}$ of red light emitted from the third optically-anisotropic layer 26C is emitted at an angle $\theta_{R3}$ that is less than the previous angle $\theta_{R2}$ with respect to the incidence light (the right circularly polarized light $R_R$ of red light).

Likewise, in a case where the left circularly polarized light $G_{2L}$ of green light having a direction of circularly polarized light that is opposite to that of blue light is incident into the third optically-anisotropic layer 26C, conversely, the left circularly polarized light $G2_L$ of green light is refracted to return to the direction indicated by arrow X as shown in the center of FIG. 7. As a result, the right circularly polarized light $G_{3R}$ of green light emitted from the third optically-anisotropic layer 26C is emitted at an angle $\theta_{G3}$ that is less than the angle $\theta_{G2}$ with respect to the incidence light (the right circularly polarized light $G_R$ of green light).

That is, in the optical element 32, the red light having the longest wavelength and large refraction by the optically-anisotropic layer is refracted in a direction opposite to the arrow X direction by the first optically-anisotropic layer 26A and is refracted twice in the opposite arrow X direction by the second optically-anisotropic layer 26B and the third optically-anisotropic layer 26C.

In addition, the green light having the second longest wavelength and the second largest refraction by the optically-anisotropic layer is refracted in a direction opposite to the arrow X direction by the first optically-anisotropic layer 26A and the second optically-anisotropic layer 26B and is refracted once in the opposite arrow X direction by the third optically-anisotropic layer 26C.

Further, the blue light having the shortest wavelength and the smallest refraction by the optically-anisotropic layer is refracted three times in a direction opposite the opposite arrow X direction by the first optically-anisotropic layer 26A, the second optically-anisotropic layer 26B, and the third optically-anisotropic layer 26C.

This way, in the optical element 32 according to the embodiment of the present invention, initially, all the light components are largely refracted in the same direction. Next, depending on the magnitude of refraction by the optically-anisotropic layer derived from a wavelength, the light having the longest wavelength is refracted to return to a direction opposite to the initial refraction direction the most multiple times. As the wavelength decreases, the number of times of refraction that returns to the direction opposite to the initial refraction direction is reduced. Regarding the light having the shortest wavelength, the number of times of refraction that returns to the direction opposite to the initial refraction direction is the smallest. As a result, the refraction angle $\theta_{R3}$ of red light, the refraction angle $\theta_{G3}$ of green light, and the refraction angle $\theta_{B3}$ of blue light with respect to incidence light can be made to be very close to each other.

Therefore, in the optical element 10 according to the embodiment of the present invention, red light, blue light, and green light that are incident can be refracted at substantially the same angle to be emitted substantially in the same direction.

In a case where light components having three wavelength ranges are targets as in the optical element 32 shown in the drawing, a designed wavelength of light having the longest wavelength is represented by $\lambda a$, a designed wavelength of light having the intermediate wavelength is represented by $\lambda b$, and a designed wavelength of light having the shortest wavelength is represented by $\lambda c$ ($\lambda a > \lambda b > \lambda c$), a single period of a liquid crystal alignment pattern in the first optically-anisotropic layer is represented by $\Lambda_1$, a single period of a liquid crystal alignment pattern in the second optically-anisotropic layer is represented by $\Lambda_2$, and a single period of a liquid crystal alignment pattern in the third optically-anisotropic layer is represented by $\Lambda_3$, emission directions of light components in two wavelength ranges can be made to be substantially the same by satisfying the following two expression.

$$\Lambda_2 = [(\lambda a+\lambda c)\lambda b/(\lambda a-\lambda b)\lambda c]\Lambda_1$$

$$\Lambda_3 = [(\lambda a+\lambda c)\lambda b/(\lambda b-\lambda c)\lambda a]\Lambda_1$$

In this expression, any one of the first optically-anisotropic layer 26A and the third optically-anisotropic layer 26C may be the first layer.

In consideration of this point, in the present invention, in the optical element 32 in which light components having three wavelengths (wavelength ranges) are targets, it is preferable that at least one of the following two expressions is satisfied, and it is more preferable that both the following two expressions are satisfied.

$$0.6*\{[(\lambda a+\lambda c)\lambda b/(\lambda a-\lambda b)\lambda c]\Lambda_1\} \leq \Lambda_2$$

$$<3.0*\{[(\lambda a+\lambda c)\lambda b/(\lambda a-\lambda b)\lambda c]\Lambda_1\}$$

$$0.6*\{[(\lambda a+\lambda c)\lambda b/(\lambda b-\lambda c)\lambda a]\Lambda_1\} < \Lambda_3$$

$$\leq 3.0*\{[(\lambda a+\lambda c))b/(\lambda b-\lambda c)\lambda a]\Lambda_1\}$$

As a result, by significantly reducing the wavelength dependence of refraction, emission directions of light components having two wavelength ranges can be made to be substantially the same.

In addition, in the present invention, in the optical element 32 in which light components having three wavelengths (wavelength ranges) are targets, it is more preferable that the following two expressions are satisfied.

$$0.7*\{[(\lambda a+\lambda c)\lambda b/(\lambda a-\lambda b)\lambda c]\Lambda_1\} \leq \Lambda_2$$

$$\leq 1.8*\{[(\lambda a+\lambda c)\lambda b/(\lambda a-\lambda b)\lambda_c]\Lambda_1\}$$

$$0.7*\{[(\lambda a+\lambda c)\lambda b/(\lambda b-\lambda c)\lambda a]\Lambda_1\} \leq \Lambda_3$$

$$\leq 1.8*\{[(\lambda a+\lambda c)\lambda b/(\lambda b-\lambda c)\lambda a]\Lambda_1\}$$

It is still more preferable that the following two expressions are satisfied.

$$0.8*\{[(\lambda a+\lambda c)\lambda b/(\lambda a-\lambda b)\lambda c]\Lambda_1\} \leq \Lambda_2$$

$$\leq 1.3*\{[(\lambda a+\lambda c)\lambda b/(\lambda a-\lambda b)\lambda c]\Lambda_1\}$$

$$0.8*\{[(\lambda a+\lambda c)\lambda b/(\lambda b-\lambda c)\lambda a]\Lambda_1\} \leq \Lambda_3$$

$$\leq 1.3*\{[(\lambda a+\lambda c)\lambda b/(\lambda b-\lambda c)\lambda a]\Lambda_1\}$$

It is still more preferable that the following two expressions are satisfied.

$$0.9*\{[(\lambda a+\lambda c)\lambda b/(\lambda a-\lambda b)\lambda c]\Lambda_1\} < \Lambda_2$$

$$\leq 1.15*\{[(\lambda a+\lambda c)\lambda b/(\lambda a-\lambda b)\lambda c]\Lambda_1\}$$

$$0.9*\{[(\lambda a+\lambda c)\lambda b/(\lambda b-\lambda c)\lambda a]\Lambda_1\} \leq \Lambda_3$$

$$\leq 1.15*\{[(\lambda a+\lambda c)\lambda b/(\lambda b-\lambda c)\lambda a]\Lambda_1\}$$

In the optical element according to the embodiment of the present invention, as described above, a plurality of optically-anisotropic layers are arranged, and depending on the wavelength of light, light having a long wavelength and large refraction by the optically-anisotropic layer is refracted in a direction opposite to the initial optically-anisotropic layer a large number of times. As a result, light components having different wavelengths can be refracted substantially at the same angle substantially in the same direction.

Therefore, in a case where the optical element according to the embodiment of the present invention includes a plurality of wavelength conversion phase difference layers, as in the optical element 32 shown in FIGS. 8 and 9, in the wavelength selective phase difference layers, it is preferable that a wavelength range of light having a turning direction of circularly polarized light that is converted into an opposite turning direction gradually becomes shorter in the arrangement direction of the optically-anisotropic layers.

In addition, in the optical element according to the embodiment of the present invention, in a case where the refraction by the initial optically-anisotropic layer is set to be large, the light is subsequently refracted gradually in the same direction, and the refraction gradually returns to the initial state in the opposite direction, the refraction of each light is easily controlled and is easily made to be uniform.

In consideration of this point, as in the optical element 32 shown in FIGS. 8 and 9, it is preferable that the single period Λ in the liquid crystal alignment pattern of the optically-anisotropic layer positioned at the most distant position in the arrangement direction is the shortest. That is, it is preferable that the refraction by the optically-anisotropic layer positioned at the most distant position in the arrangement direction is the largest.

In the optical element according to the embodiment of the present invention, the single period Λ in the liquid crystal alignment pattern of the optically-anisotropic layer may gradually increase in the arrangement direction of the optically-anisotropic layers. Alternatively, as in the optical element 32 shown in FIGS. 8 and 9, a change in the single period Λ of the liquid crystal alignment pattern of the optically-anisotropic layer may be irregular in the arrangement direction of the optically-anisotropic layers, for example, a configuration in which an optically-anisotropic layer having an intermediate length of the single period Λ of the liquid crystal alignment pattern is provided between an optically-anisotropic layer having the longest single period Λ of the liquid crystal alignment pattern and an optically-anisotropic layer having the shortest single period Λ of the liquid crystal alignment pattern. That is, in the optical element according to the embodiment of the present invention, the single period Λ in the liquid crystal alignment pattern of each of the optically-anisotropic layers may be appropriately set depending on the wavelength of light and the refractive index of the optically-anisotropic layer.

In a case where the optical element according to the embodiment of the present invention includes a plurality of wavelength conversion phase difference layers, basically, the optically-anisotropic layers and the wavelength conversion phase difference layers are alternately arranged as in the optical element 32 shown in FIGS. 8 and 9. At this time, it is preferable that the number of the wavelength conversion phase difference layers is less than the number of the optically-anisotropic layers by one.

However, the present invention is not limited to this configuration. For example, a plurality of optically-anisotropic layers may be continuously arranged such that light that is continuously refracted by the plurality of optically-anisotropic layers is incident into the wavelength conversion phase difference layer.

In addition, a plurality of wavelength conversion phase difference layers may be arranged between two optically-anisotropic layers. However, in a case where a plurality of wavelength conversion phase difference layers that convert circularly polarized light having the same wavelength range into circularly polarized light having an opposite turning direction are arranged between two optically-anisotropic layers, it is preferable that the number of the wavelength conversion phase difference layers is an odd number.

In the optical element according to the embodiment of the present invention, optically-anisotropic layers having the same single period Λ of the liquid crystal alignment pattern may be present.

However, from the viewpoint that, for example, refraction, that is, emission angles of light components having a plurality of wavelength ranges can be easily made to be uniform, it is preferable that all the optically-anisotropic layers have different single periods Λ of the liquid crystal alignment patterns.

In the optical element according to the embodiment of the present invention, the single period Λ in the alignment pattern of the optically-anisotropic layer is not particularly limited and may be appropriately set depending on the use of the optical element and the like.

The optical element according to the embodiment of the present invention may include a wavelength selective phase difference layer that selectively converts circularly polarized light having the shortest designed wavelength into circularly polarized light having an opposite turning direction. For example, a third wavelength selective phase difference layer B that selectively converts circularly polarized light of blue light into circularly polarized light having an opposite turning direction may be disposed after the third optically-anisotropic layer 26C (on the downstream side in an advancing direction of light).

As described above, the third wavelength selective phase difference layer B converts only the circularly polarized light of blue light into circularly polarized light having an opposite turning direction and allows transmission of the other light as it is.

Accordingly, in a case where the right circularly polarized light $R_{3R}$ of red light, the right circularly polarized light $G_{3R}$ of green light and the left circularly polarized light $B_{3L}$ of blue light are incident into and transmits through the third wavelength selective phase difference layer B, the right circularly polarized light $R_{3R}$ of red light and the right circularly polarized light $G_{3R}$ of green light transmit through the third wavelength selective phase difference layer B as it is. On the other hand, the left circularly polarized light $B_{3L}$ of blue light is converted into right circularly polarized light $B_3R$ of blue light.

As a result, circularly polarized light components of blue light, green light, and red light emitted from the optical element can be made to have the same turning direction.

Here, the optical element according to the embodiment of the present invention can be suitably used as, for example, a diffraction element that refracts light displayed by a display to be introduced into a light guide plate in AR glasses or a diffraction element that refracts light propagated in a light guide plate to be emitted to an observation position by a user from the light guide plate. In particular, the optical element 32 that can handle with a full color image can be suitably used as a diffraction element in AR glasses.

At this time, in order to totally reflect light from the light guide plate, it is necessary to refract light to be introduced into the light guide plate at a large angle to some degree with respect to incidence light. In addition, in order to reliably emit light propagated in the light guide plate, it is necessary to refract light at a large angle to some degree with respect to incidence light.

In addition, as described above, regarding the transmission angle of light through the optically-anisotropic layer, the angle of transmitted light with respect to incidence light can be increased by reducing the single period Λ in the liquid crystal alignment pattern.

In consideration of this point, the single period Λ in the liquid crystal alignment pattern of the optically-anisotropic layer is preferably 50 µm or less, more preferably 10 µm or less, and still more preferably 3 µm or less.

In consideration of the accuracy of the liquid crystal alignment pattern and the like, the single period Λ in the liquid crystal alignment pattern of the optically-anisotropic layer is preferably 0.1 µm or more.

In the optical elements shown in FIGS. 1 to 10, the optical axis 30A of the liquid crystal compound 30 in the liquid crystal alignment pattern of the optically-anisotropic layer continuously rotates only in the arrow X direction.

However, the present invention is not limited thereto, and various configurations can be used as long as the optical axis 30A of the liquid crystal compound 30 in the optically-anisotropic layer continuously rotates in the in-plane direction.

Figure 12:
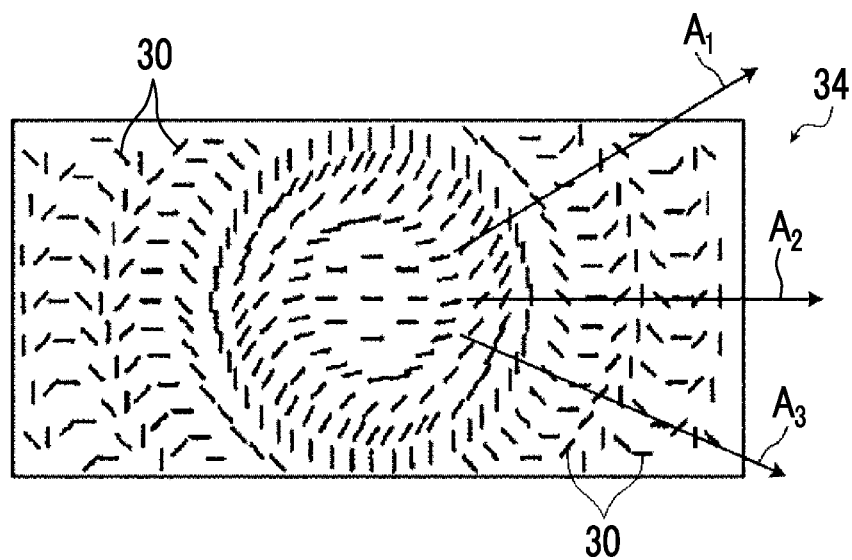
FIG. 12 is a plan view showing another example of the optically-anisotropic layer of the optical element according to the present invention.

For example, an optically-anisotropic layer 34 conceptually shown in a plan view of FIG. 12 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside. In other words, the liquid crystal alignment pattern of the optically-anisotropic layer 34 shown in FIG. 12 is a liquid crystal alignment pattern where the in-plane direction in which the direction of the optical axis of the liquid crystal compound 30 changes while continuously rotating is provided in a radial shape from the center of the optically-anisotropic layer 34.

FIG. 12 shows only the liquid crystal compound 30 of the surface of the alignment film as in FIG. 4. However, as shown in FIG. 2, the optically-anisotropic layer 34 has the structure in which the liquid crystal compound 30 on the surface of the alignment film is laminated as described above.

FIG. 12 shows only one optically-anisotropic layer 34. However, as described above, the optical element according to the embodiment of the present invention includes a plurality of optically-anisotropic layers, in which a wavelength selective phase difference layer is provided between at least one pair of optically-anisotropic layers. Accordingly, even in a case where the optical element includes the optically-anisotropic layer having the concentric circular liquid crystal alignment pattern, for example, as in the optical element 32 shown in FIG. 8, the optical element has a configuration in which a first optically-anisotropic layer, a wavelength selective phase difference layer that converts circularly polarized light of red light, a second optically-anisotropic layer, a wavelength selective phase difference layer that converts circularly polarized light of green light, and a third optically-anisotropic layer are arranged.

In the optically-anisotropic layer 34 shown in FIG. 12, the optical axis (not shown) of the liquid crystal compound 30 is a longitudinal direction of the liquid crystal compound 30.

In the optically-anisotropic layer 34, the direction of the optical axis of the liquid crystal compound 30 changes while continuously rotating in a direction in which a large number of optical axes move to the outside from the center of the optically-anisotropic layer 34, for example, a direction indicated by an arrow A1, a direction indicated by an arrow A2, a direction indicated by an arrow A3, or . . . .

In circularly polarized light incident into the optically-anisotropic layer 34 having the above-described liquid crystal alignment pattern, the absolute phase changes depending on individual local regions having different optical axes of the liquid crystal compound 30. At this time, the amount of change in absolute phase varies depending on the directions of the optical axes of the liquid crystal compound 30 into which circularly polarized light is incident.

This way, in the optically-anisotropic layer 34 having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 30 and the direction of circularly polarized light to be incident.

That is, by setting the liquid crystal alignment pattern of the optically-anisotropic layer in a concentric circular shape, the optical element according to the embodiment of the present invention exhibits, for example, a function as a convex lens or a concave lens.

Here, in a case where the liquid crystal alignment pattern of the optically-anisotropic layer is concentric circular such that the optical element functions as a convex lens, it is preferable that the length of the single period Λ over which the optical axis rotates by 180° in the liquid crystal alignment pattern gradually decreases from the center of the optically-anisotropic layer 34 toward the outer direction in the in-plane direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light gathering power of the optically-anisotropic layer 34 can be improved, and the performance as a convex lens can be improved.

In the present invention, depending on the uses of the optical element such as a concave lens, it is preferable that the length of the single period Λ over which the optical axis rotates by 180° in the liquid crystal alignment pattern gradually decreases from the center of the optically-anisotropic layer 34 toward the outer direction in the in-plane direction by reversing the direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light diverging power of the optically-anisotropic layer 34 can be improved, and the performance as a concave lens can be improved.

In the present invention, for example, in a case where the optical element is used as a concave lens, it is preferable that the turning direction of incident circularly polarized light is reversed.

In the present invention, in a case where the optical element is made to function as a convex lens or a concave lens, it is preferable that the optical element satisfies the following expression.

$$\Phi = (\pi/\lambda)[(r^2+f^2)^{1/2} - f]$$

Here, r represents a distance from the center of a concentric circle and is represented by the following expression "$r=(x^2+y^2)^{1/2}$". x and y represent in-plane positions, and $(x,y)=(0,0)$ represents the center of the concentric circle. $\Phi(r)$ represents an angle of the optical axis at the distance r from the center, λ represents a wavelength, and f represents a designed focal length.

In the present invention, conversely, the length of the single period Λ in the concentric circular liquid crystal alignment pattern may gradually increase from the center of the optically-anisotropic layer 34 toward the outer direction in the in-plane direction in which the optical axis continuously rotates.

Further, depending on the uses of the optical element such as a case where it is desired to provide a light amount distribution in transmitted light, a configuration in which regions having partially different lengths of the single periods Λ in the in-plane direction in which the optical axis continuously rotates are provided can also be used instead of the configuration in which the length of the single period Λ gradually changes in the in-plane direction in which the optical axis continuously rotates.

Further, the optical element according to the embodiment of the present invention may include: an optically-anisotropic layer in which the single period Λ is uniform over the entire surface; and an optically-anisotropic layer in which regions having different lengths of the single periods Λ are provided. This point is also applicable to a configuration in which the optical axis continuously rotates only in the in-plane direction.

Figure 13:
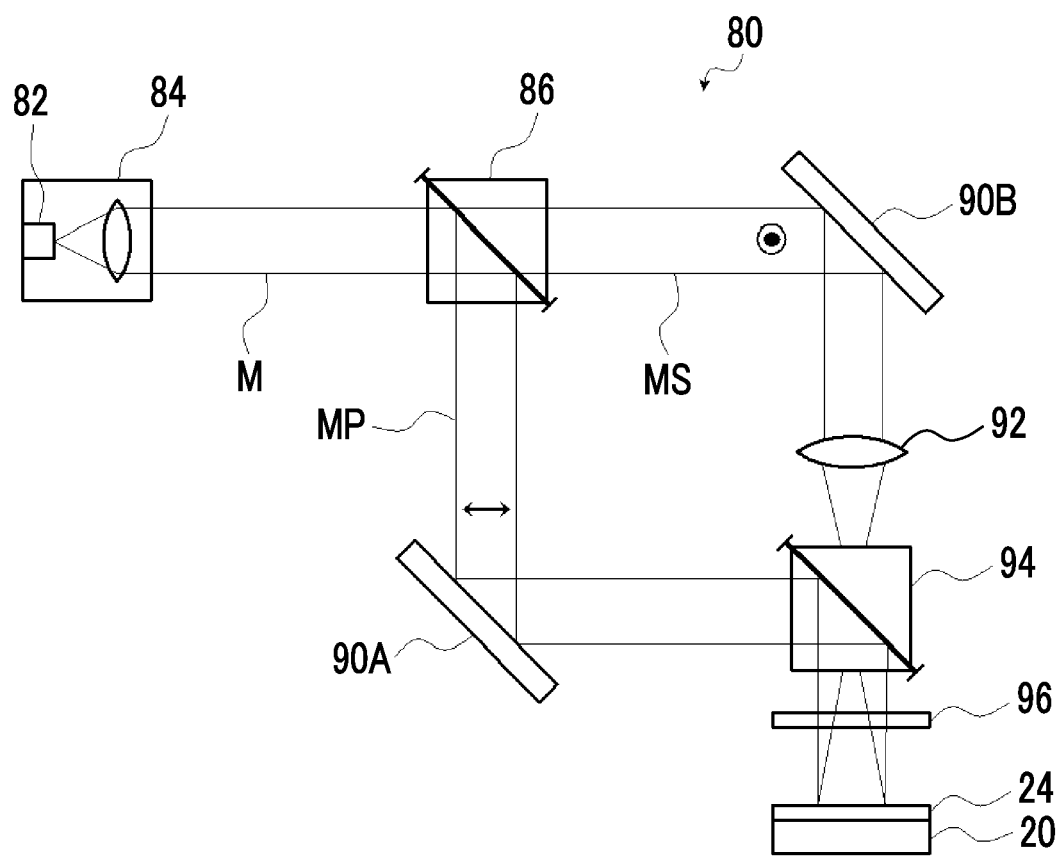
FIG. 13 is a diagram conceptually showing an example of an exposure device that exposes an alignment film forming the optically-anisotropic layer shown in FIG. 12.

FIG. 13 conceptually shows an example of an exposure device that forms the concentric circular alignment pattern in the alignment film. Examples of the alignment film include the alignment film 24A, the alignment film 24B, and the alignment film 24C.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is gathered by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 24 on the support 20.

Due to interference between the right circularly polarized light and the left circularly polarized light, the polarization state of light with which the alignment film 24 is irradiated periodically changes according to interference fringes. The intersection angle between the right circularly polarized light and the left circularly polarized light changes from the inside to the outside of the concentric circle. Therefore, an exposure pattern in which the pitch changes from the inside to the outside can be obtained. As a result, in the alignment film 24, a concentric circular alignment pattern in which the alignment state periodically changes can be obtained.

In the exposure device 80, the single period Λ in the liquid crystal alignment pattern in which the optical axis of the liquid crystal compound 30 continuously rotates by 180° in the in-plane direction can be controlled by changing the refractive power of the lens 92 (the F number of the lens 92), the focal length of the lens 92, the distance between the lens 92 and the alignment film 24, and the like.

In addition, by adjusting the refractive power of the lens 92 (the F number of the lens 92), the length Λ of the single period in the liquid crystal alignment pattern in the in-plane direction in which the optical axis continuously rotates can be changed.

Specifically, In addition, the length Λ of the single period in the liquid crystal alignment pattern in the in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inside toward the outside, and the F number increases. Conversely, in a case where the refractive power of the lens 92 becomes stronger, the length Λ of the single period in the liquid crystal alignment pattern rapidly decreases from the inside toward the outside, and the F number decreases.

This way, the configuration of changing the length of the single period Λ over which the optical axis rotates by 180° in the in-plane direction in which the optical axis continuously rotates can also be used in the configuration shown in FIGS. 1 to 10 in which the optical axis 30A of the liquid crystal compound 30 continuously rotates only in the in-plane direction as the arrow X direction.

For example, by gradually decreasing the single period Λ of the liquid crystal alignment pattern in the arrow X direction, an optical element that allows transmission of light to be gathered can be obtained. In addition, by reversing the direction in which the optical axis in the liquid crystal alignment pattern rotates by 180°, an optical element that allows transmission of light to be diffused only in the arrow X direction can be obtained. By reversing the turning direction of incident circularly polarized light, an optical element that allows transmission of light to be diffused only in the arrow X direction can be obtained.

Further, depending on the uses of the optical element such as a case where it is desired to provide a light amount distribution in transmitted light, a configuration in which regions having partially different lengths of the single periods Λ in the arrow X direction are provided can also be used instead of the configuration in which the length of the single period Λ gradually changes in the arrow X direction. For example, as a method of partially changing the single period Λ, for example, a method of scanning and exposing the photo-alignment film to be patterned while freely changing a polarization direction of laser light to be gathered can be used.

The optical element according to the embodiment of the present invention can be used for various uses where transmission of light in a direction different from an incidence direction is allowed, for example, an optical path changing member, a light gathering element, a light diffusing element to a predetermined direction, a diffraction element, or the like in an optical device.

Figure 14:
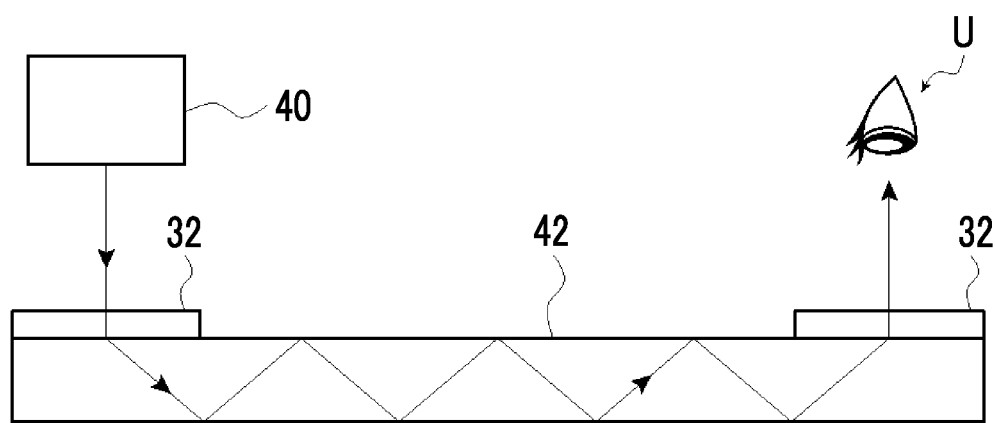
FIG. 14 is a diagram conceptually showing an example of AR glasses including one example of a light guide element according to the present invention.

In a preferable example, as conceptually shown in FIG. 14, the optical element can be used as a diffraction element that is provided to be spaced from the light guide plate 42 such that, in the above-described AR glasses, light (projection image) emitted from the display 40 is guided to the light guide plate 42 in the above-described AR glasses at a sufficient angle for total reflection and the light propagated in the light guide plate 42 is emitted from the light guide plate 42 to an observation position by a user U in the AR glasses. FIG. 14 shows the optical element 32 shown in FIG. 8 corresponding to a full color image. For example, in a case where a two-color image is displayed in the AR glasses, the optical element 10 shown in FIG. 1 can also be suitably used.

As described above, in the optical element according to the embodiment of the present invention, the angle dependence of the refraction angle during transmission is small. Therefore, red light, green light, and blue light emitted from the display 40 can be refracted in the same direction. Therefore, with one light guide plate 42, even in a case where red image, green image, and blue image are propagated, a full color image having no color shift can be emitted from the light guide plate to the observation position by the user U in the AR glasses. Accordingly, in the optical element according to the embodiment of the present invention including the optical element according to the embodiment of the present invention, the light guide plate of the AR glasses can be made thin and light as a whole, and the configuration of the AR glasses can be simplified.

The light guide element according to the embodiment of the present invention is not limited to the configuration in which two optical elements according to the embodiment of the present invention spaced from each other are provided in the light guide plate 42 as shown in FIG. 13. A configuration in which only one optical element according to the embodiment of the present invention is provided in the light guide plate for introduction or extraction of light into or from the light guide plate 42.

In the above-described example, the optical element according to the embodiment of the present invention is used as the optical element that includes two or three optically-anisotropic layers and allows transmission of two light components including green light and blue light or three light components including red light, green light, and blue light to refract the light components. However, the present invention is not limited to this example, and various configurations can be used.

For example, the optical element according to the embodiment of the present invention may have a configuration in which three optically-anisotropic layers and two wavelength selective phase difference layers are provided as in FIG. 1 and transmission of not only two light components selected from red light, green light, and blue light but also infrared light or ultraviolet light is allowed to refract the light components. Alternatively, the optical element according to the embodiment of the present invention may have a configuration in which four or five optically-anisotropic layers and three or four wavelength selective phase difference layers are provided and transmission of not only red light, green light, and blue light but also infrared light and/or ultraviolet light is allowed to refract the light components. For example, the optical element according to the embodiment of the present invention may have a configuration in which six or more optically-anisotropic layers and (the number of the optically-anisotropic layers—1) of wavelength selective phase difference layers are provided and transmission of not only red light, green light, and blue light but also light components having three or more different wavelength ranges is allowed to refract the light components. Alternatively, the optical element according to the embodiment of the present invention may have a configuration in which two optically-anisotropic layers and one wavelength selective phase difference layer are provided as in FIG. 1 and transmission of red light and blue light or transmission of red light and green light is allowed to refract the light components, a configuration in which not only one light component selected from red light, green light, or blue light but also infrared light or ultraviolet light are refracted to be transmitted. In addition, the optical element according to the embodiment of the present invention may have a configuration in which infrared light and/or ultraviolet light is refracted and transmitted.

Hereinabove, the optical element and the light guide element according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of First Optically-Anisotropic Member>
(Support and Saponification Treatment of Support)

As the support, a commercially available triacetyl cellulose film (manufactured by Fuji Film Co., Ltd., Z-TAC) was used.

The support was caused to pass through an induction heating roll at a temperature of 60° C. such that the support surface temperature was increased to 40° C.

Next, an alkali solution shown below was applied to a single surface of the support using a bar coater in an application amount of 14 mL (liter)/m², the support was heated to 110° C., and the support was transported for 10 seconds under a steam infrared electric heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| | |
|---|---|
| Potassium hydroxide | 4.70 parts by mass |
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

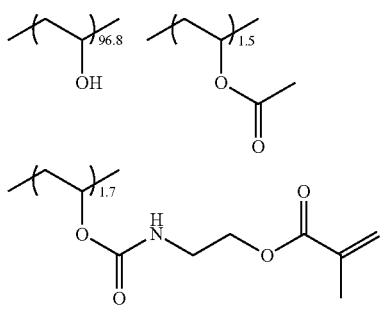

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| Material A for photo-alignment | 1.00 part by mass |
|---|---|
| Water | 16.00 parts by mass |
| Butoxyethanol | 42.00 parts by mass |
| Propylene glycol monomethyl ether | 42.00 parts by mass |

—Material A for Photo-Alignment—

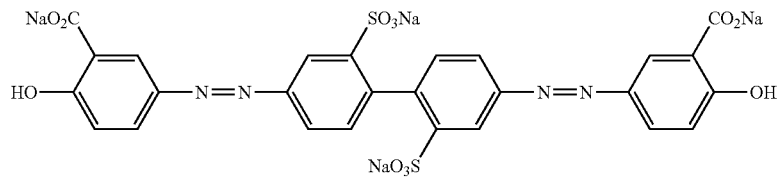

(Exposure of Alignment Film)

The alignment film was exposed using the exposure device shown in FIG. 11 to form an alignment film P-1 having an alignment pattern.

In the exposure device, a laser that emits laser light having a wavelength (405 nm) was used as the semiconductor laser. The exposure dose of the interference light was 100 mJ/cm$^2$. The single period (the length over which the optical axis derived from the liquid crystal compound rotates by 180°) of an alignment pattern formed by two laser beams and interference thereof was controlled by changing an intersection angle (intersection angle α) between the two beams.

(Formation of First Optically-Anisotropic Layer)

As the liquid crystal composition forming the optically-anisotropic layer, the following composition A-1 was prepared.

Composition A-1

| Liquid crystal compound L-1 | 100.00 parts by mass |
|---|---|
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 313.00 parts by mass |

Liquid Crystal Compound L-1

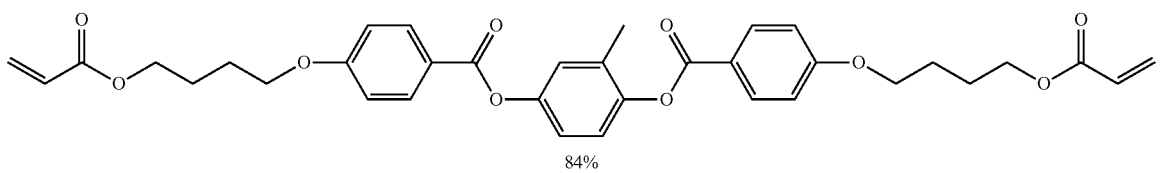

84%

-continued

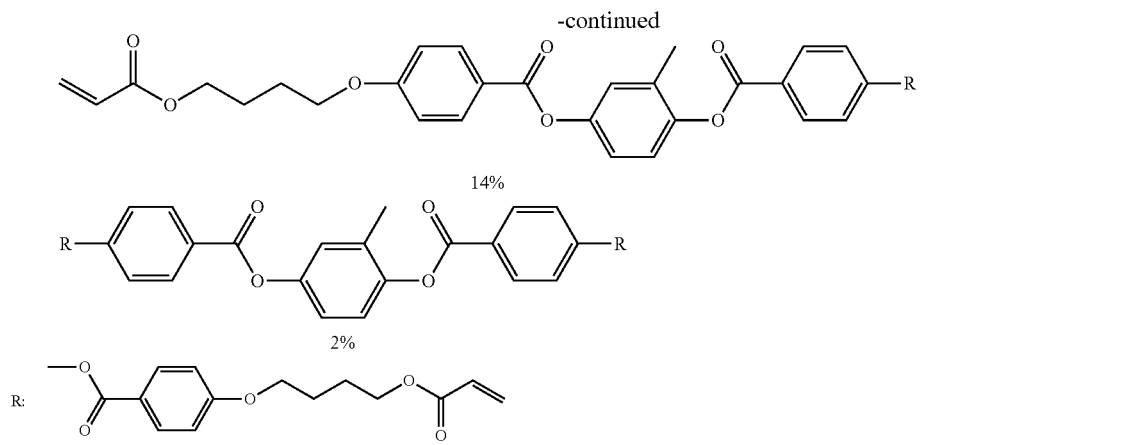

Leveling Agent T-1

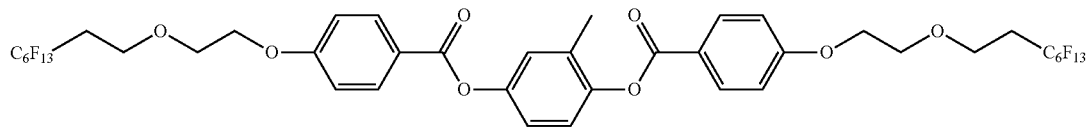

The first optically-anisotropic layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 70° C., the coating film was cooled to 25° C., and the coating film was irradiated with ultraviolet light having a wavelength of 365 nm at an irradiation dose of 100 mJ/cm² using a high-pressure mercury lamp in a nitrogen atmosphere. As a result, the alignment of the liquid crystal compound was immobilized. At this time, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a first optically-anisotropic layer was formed, and a first optically-anisotropic member was prepared.

Finally, in the first optically-anisotropic layer, $\Delta n_{550} \times$ thickness (Re(550)) of the liquid crystals was 275 nm, and it was verified using a polarizing microscope that periodic alignment occurred on the surface as shown in FIG. 3. In the liquid crystal alignment pattern of the first optically-anisotropic layer, the single period over which the optical axis derived from the liquid crystal compound rotated by 180° was 3.0 μm. Hereinafter, unless specified otherwise, "$\Delta n_{550} \times d$" and the like were measured as described above.

<Preparation of Second Optically-Anisotropic Member>

An alignment film P-2 having an alignment pattern was formed using the same method as that of the alignment film P-1, except that, in a case where the alignment film was exposed using the exposure device shown in FIG. 11, the intersection angle between two light components was changed.

A second optically-anisotropic layer was formed using the same method as that of the first optically-anisotropic layer, except that multiple layers of the composition A-1 were applied to the alignment film P-2. Using the second optically-anisotropic layer, a second optically-anisotropic member was prepared.

Finally, in the second optically-anisotropic layer, $\Delta n_{550} \times$ thickness (Re(550)) of the liquid crystals was 275 nm, and it was verified using a polarizing microscope that periodic alignment occurred on the surface as shown in FIG. 3. In the liquid crystal alignment pattern of the second optically-anisotropic layer, the single period over which the optical axis derived from the liquid crystal compound rotated by 180° was 36.9 μm.

<Preparation of Third Optically-Anisotropic Member>

An alignment film P-3 having an alignment pattern was formed using the same method as that of the alignment film P-1, except that, in a case where the alignment film was exposed using the exposure device shown in FIG. 11, the intersection angle between two light components was changed.

A third optically-anisotropic layer was formed using the same method as that of the first optically-anisotropic layer, except that multiple layers of the composition A-1 were applied to the alignment film P-3. Using the third optically-anisotropic layer, a third optically-anisotropic member was prepared.

Finally, in the third optically-anisotropic layer, $\Delta n_{550} \times$ thickness (Re(550)) of the liquid crystals was 275 nm, and it was verified using a polarizing microscope that periodic alignment occurred on the surface as shown in FIG. 3. In the liquid crystal alignment pattern of the third optically-anisotropic layer, the single period over which the optical axis derived from the liquid crystal compound rotated by 180° was 34.3 μm.

<Preparation of Wavelength Selective Phase Difference Layer>

(Formation of Alignment Film P-4)

An alignment film P-4 was formed using the same method as that of the first optically-anisotropic member.

(Exposure of Alignment Film P-4)

By irradiating the obtained alignment film P-4 with polarized ultraviolet light (50 mJ/cm², using an extra high pressure mercury lamp), the alignment film was exposed.

[Preparation of λ/4 Plate]

As the liquid crystal composition forming the λ/4, the following composition C-1 was prepared.

Composition C-1

| | |
|---|---|
| Liquid crystal compound L-2 | 42.00 parts by mass |
| Liquid crystal compound L-3 | 42.00 parts by mass |
| Liquid crystal compound L-4 | 16.00 parts by mass |
| Polymerization initiator PI-1 | 0.50 parts by mass |
| Leveling agent G-1 | 0.20 parts by mass |
| Methyl ethyl ketone | 176.00 parts by mass |
| Cyclopentanone | 44.00 parts by mass |

—Liquid Crystal Compound L-2—

—Polymerization initiator PI-1—

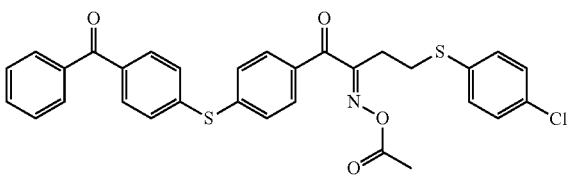

—Leveling Agent G-1—

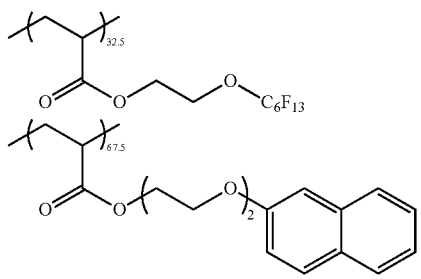

As the λ/4 plate, a layer consisting of a reverse dispersion liquid crystal compound was formed.

The λ/4 plate was formed by applying the following composition C-1 to the alignment film P-4. The applied coating film was heated using a hot plate at 70° C., the

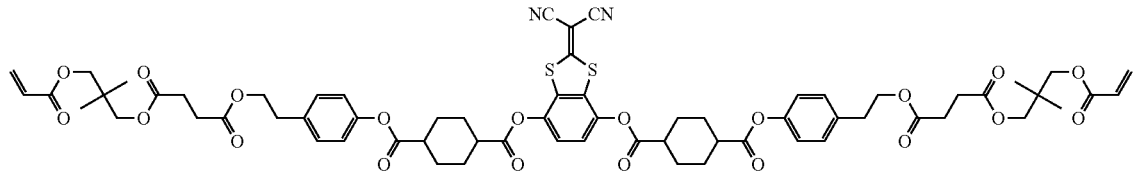 [SMILES: C=CC(=O)OCC(C)(C)COC(=O)CCC(=O)OCCc1ccc(OC(=O)C2CCC(C(=O)Oc3ccc(OC(=O)C4CCC(C(=O)Oc5ccc(CCOC(=O)CCC(=O)OCC(C)(C)COC(=O)C=C)cc5)CC4)c4c3SC(=C(C#N)C#N)S4)CC2)cc1]

—Liquid Crystal Compound L-3—

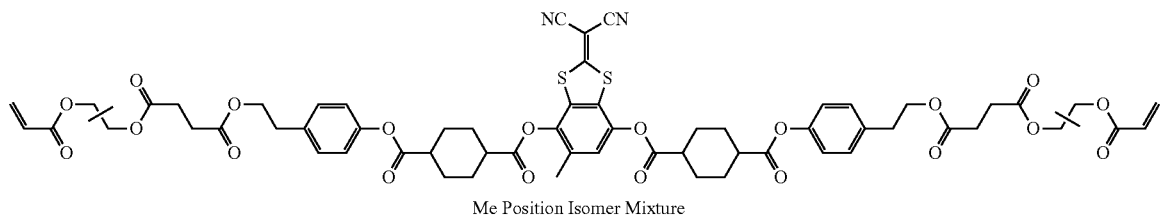

Me Position Isomer Mixture

—Liquid Crystal Compound L-4—

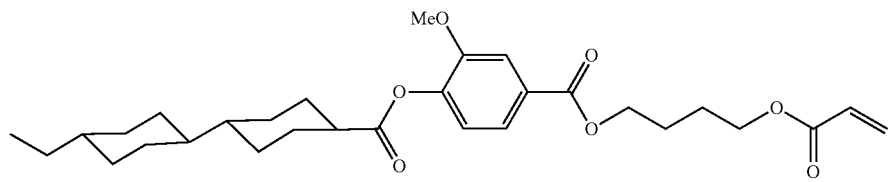 [SMILES: C=CC(=O)OCCCCOC(=O)c1ccc(OC(=O)C2CCC(C3CCC(CC)CC3)CC2)c(OC)c1]

coating film was cooled to 65° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized.

As a result, a λ/4 plate was obtained. Re(550) of the obtained λ/4 plate was 128 nm.

(Preparation of λ plate at λ, =490 nm)

As the liquid crystal composition forming the λ, the following composition C-2 was prepared.

Composition C-2

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent G-1 | 0.20 parts by mass |
| Methyl ethyl ketone | 243.00 parts by mass |

The 2 plate was formed by applying the following composition C-2 to the alignment film P-4. The applied coating film was heated using a hot plate at 70° C., the coating film was cooled to 25° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized. As a result, a κ plate was obtained.

Re(490) of the obtained λ plate at the wavelength λ=490 nm was 490 nm.

(Preparation of 2λ plate at λ=490 nm)

A 2λ plate was obtained using the same preparation method as that of the λ plate, except that the thickness of the coating film of the liquid crystal compound was changed.

Re(490) of the obtained 2λ plate at the wavelength λ=490 nm was 980 nm.

The λ/4 plate, the λ plate, and the 2λ plate were laminated such that the layer configuration was as shown in the following Table 1. The layers were sequentially laminated such that the layer having the smallest layer number in Table 1 was the first optically-anisotropic layer side. In addition, during the lamination, the layers were sequentially laminated after peeling off the support and the alignment film. As a result, a first wavelength selective phase difference layer that converted circularly polarized light of red light into circularly polarized light having an opposite turning direction and allowed transmission of the other light was prepared.

TABLE 1

| Layer Number | λ [nm] | Re(λ) [nm] | Re(450)/Re(550) | Slow Axis Direction [°] |
|---|---|---|---|---|
| 1 | 550 | 128 | 0.86 | −45 |
| 2 | 490 | 490 | 1.09 | 45 |
| 3 | 490 | 980 | 1.09 | −15.7 |
| 4 | 490 | 980 | 1.09 | 14.5 |
| 5 | 490 | 980 | 1.09 | −4 |
| 6 | 490 | 980 | 1.09 | 8.5 |
| 7 | 490 | 980 | 1.09 | −0.4 |
| 8 | 490 | 980 | 1.09 | 6.1 |
| 9 | 490 | 980 | 1.09 | 1.5 |
| 10 | 490 | 980 | 1.09 | 4.7 |
| 11 | 550 | 128 | 0.86 | 45 |

The λ/4 plate, the λ plate, and the 2λ plate were laminated using the same method as described above such that the layer configuration was as shown in the following Table 2, except that Re(λ) and the slow axis direction were changed as shown in Table 1.

As a result, a second wavelength selective phase difference layer that converted circularly polarized light of green light into circularly polarized light having an opposite turning direction and allowed transmission of the other light was prepared.

TABLE 2

| Layer Number | λ [nm] | Re(λ) [nm] | Re(450)/Re(550) | Slow Axis Direction [°] |
|---|---|---|---|---|
| 1 | 550 | 128 | 0.86 | 45 |
| 2 | 725 | 725 | 1.09 | −45 |
| 3 | 725 | 1450 | 1.09 | 74.3 |
| 4 | 725 | 1450 | 1.09 | −75.5 |
| 5 | 725 | 1450 | 1.09 | 86 |
| 6 | 725 | 1450 | 1.09 | −81.5 |
| 7 | 725 | 1450 | 1.09 | 89.6 |
| 8 | 725 | 1450 | 1.09 | −83.9 |
| 9 | 725 | 1450 | 1.09 | −88.5 |
| 10 | 725 | 1450 | 1.09 | −85.3 |
| 11 | 550 | 128 | 0.86 | −45 |

<Preparation of Optical Element>

By bonding the first optically-anisotropic layer, the first wavelength selective phase difference layer, the second optically-anisotropic layer, the second wavelength selective phase difference layer, and the third optically-anisotropic layer in this order using an adhesive, an optical element was prepared. During bonding, the layers were bonded after peeling off the support and the alignment film from each of the optically-anisotropic layers and each of the wavelength selective phase difference layers. This configuration corresponds to the aspect where the support 20 and the alignment film 24A, 24B, and 24C are removed from the conceptual diagram shown in FIG. 8.

Example 2

A first optically-anisotropic member, a second optically-anisotropic member, and a third optically-anisotropic member were prepared using the same method as that of Example 1, except that, in a case where the alignment film was exposed using the exposure device shown in FIG. 11, the intersection angle between two light components was changed.

The following was verified using the same method as that of Example 1. In the liquid crystal alignment pattern of the first optically-anisotropic layer, the single period over which the optical axis derived from the liquid crystal compound rotated by 180° was 1.1 µm.

In the liquid crystal alignment pattern of the second optically-anisotropic layer, the single period over which the optical axis derived from the liquid crystal compound rotated by 180° was 12.8 mm.

In the liquid crystal alignment pattern of the third optically-anisotropic layer, the single period over which the optical axis derived from the liquid crystal compound rotated by 180° was 11.9 µm.

The λ/4 plate, the λ plate, and the 2λ plate were laminated using the same method as described above such that the layer configuration was as shown in the following Table 3, except that Re(λ) and the slow axis direction were changed as shown in Table 1.

As a result, a first wavelength selective phase difference layer that converted circularly polarized light of red light into circularly polarized light having an opposite turning direction and allowed transmission of the other light was prepared.

TABLE 3

| Layer Number | λ [nm] | Re(λ) [nm] | Re(450)/Re(550) | Slow Axis Direction [°] |
|---|---|---|---|---|
| 1 | 550 | 129 | 0.86 | −42.6 |
| 2 | 492 | 492 | 1.09 | 42.6 |
| 3 | 492 | 1050 | 1.09 | −14.4 |
| 4 | 492 | 1050 | 1.09 | 13.3 |
| 5 | 492 | 1053 | 1.09 | −3.7 |
| 6 | 492 | 1053 | 1.09 | 7.8 |
| 7 | 492 | 1053 | 1.09 | −0.4 |
| 8 | 492 | 1053 | 1.09 | 5.6 |
| 9 | 492 | 1053 | 1.09 | 1.4 |
| 10 | 492 | 1053 | 1.09 | 4.3 |
| 11 | 550 | 129 | 0.86 | 42.6 |

The λ/4 plate, the λ plate, and the λ plate were laminated using the same method as described above such that the layer configuration was as shown in the following Table 4, except that Re(λ) and the slow axis direction were changed as shown in Table 1.

As a result, a second wavelength selective phase difference layer that converted circularly polarized light of green light into circularly polarized light having an opposite turning direction and allowed transmission of the other light was prepared.

TABLE 4

| Layer Number | λ [nm] | Re(λ) [nm] | Re(450)/Re(550) | Slow Axis Direction [°] |
|---|---|---|---|---|
| 1 | 550 | 127 | 0.86 | 43.1 |
| 2 | 719 | 719 | 1.09 | −43.1 |
| 3 | 719 | 1383 | 1.09 | 73.3 |
| 4 | 719 | 1383 | 1.09 | −74.6 |
| 5 | 719 | 1383 | 1.09 | 85.7 |
| 6 | 719 | 1383 | 1.09 | −80.9 |
| 7 | 719 | 1383 | 1.09 | 89.6 |
| 8 | 719 | 1383 | 1.09 | −83.5 |
| 9 | 719 | 1383 | 1.09 | −88.4 |
| 10 | 719 | 1383 | 1.09 | −85 |
| 11 | 550 | 127 | 0.86 | −43.1 |

An optical element was prepared with the same method as that of Example 1 using the first optically-anisotropic member, the second optically-anisotropic member, the third optically-anisotropic member, the first wavelength selective phase difference layer, and the second wavelength selective phase difference layer.

Example 3

<Preparation of First Optically-Anisotropic Member>

An alignment film P-4 having an alignment pattern was formed using the same method as that of the alignment film P-1, except that, in a case where the alignment film was exposed using the exposure device shown in FIG. 11, the intersection angle between two light components was changed.

As the liquid crystal composition forming the optically-anisotropic layer, the following composition B-1 was prepared.

Composition B-1

| Liquid crystal compound L-5 | 80.00 parts by mass |
| Liquid crystal compound L-6 | 20.00 parts by mass |
| Polymerization initiator (IRGACURE (registered trade name) 907, manufactured by BASF SE) | 5.00 parts by mass |
| MEGAFACE F444 (manufactured by DIC Corporation) | 0.18 parts by mass |
| Methyl ethyl ketone | 315.00 parts by mass |

Liquid Crystal Compound L-5

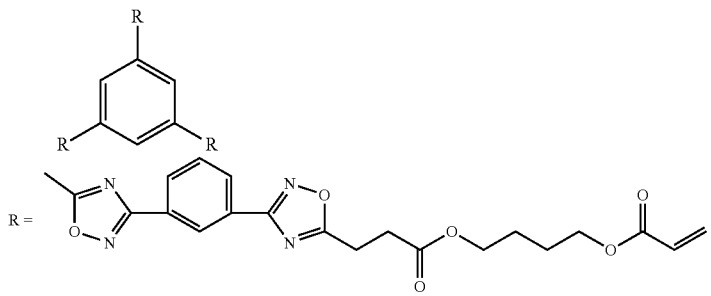

Liquid Crystal Compound L-6

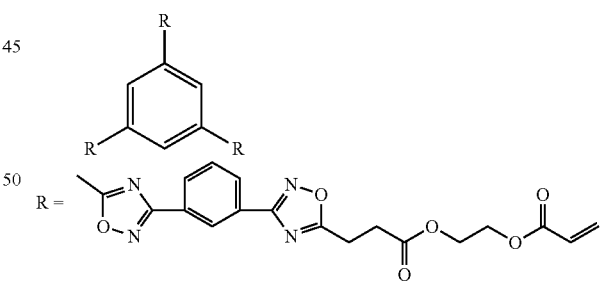

A first optically-anisotropic layer was formed using the same method as that of the first optically-anisotropic layer according to Example 1, except that multiple layers of the composition B-1 were applied to the alignment film P-4. Using the first optically-anisotropic layer, a first optically-anisotropic member was prepared.

Finally, in the first optically-anisotropic layer, $\Delta n_{550} \times$ thickness (Re(550)) of the liquid crystals was 275 nm, and it was verified using a polarizing microscope that periodic alignment occurred on the surface (refer to FIG. 15). In the liquid crystal alignment pattern of the first optically-anisotropic layer, the single period over which the optical axis derived from the liquid crystal compound rotated by 180° was 1.1 μm.

<Preparation of Second Optically-Anisotropic Member>

An alignment film P-5 having an alignment pattern was formed using the same method as that of the alignment film P-1, except that, in a case where the alignment film was exposed using the exposure device shown in FIG. 11, the intersection angle between two light components was changed.

A second optically-anisotropic layer was formed using the same method as that of the first optically-anisotropic layer according to Example 1, except that multiple layers of the composition B-1 were applied to the alignment film P-5. Using the second optically-anisotropic layer, a second optically-anisotropic member was prepared.

Finally, in the second optically-anisotropic layer, $\Delta n_{550} \times$ thickness (Re(550)) of the liquid crystals was 275 nm, and it was verified using a polarizing microscope that periodic alignment occurred on the surface (refer to FIG. 15). In the liquid crystal alignment pattern of the second optically-anisotropic layer, the single period over which the optical axis derived from the liquid crystal compound rotated by 180° was 12.8 μm.

<Preparation of Third Optically-Anisotropic Member>

An alignment film P-6 having an alignment pattern was formed using the same method as that of the alignment film P-1, except that, in a case where the alignment film was exposed using the exposure device shown in FIG. 11, the intersection angle between two light components was changed.

A third optically-anisotropic layer was formed using the same method as that of the first optically-anisotropic layer according to Example 1, except that multiple layers of the composition B-1 were applied to the alignment film P-6. Using the third optically-anisotropic layer, a third optically-anisotropic member was prepared.

Finally, in the third optically-anisotropic layer, $\Delta n_{550} \times$ thickness (Re(550)) of the liquid crystals was 275 nm, and it was verified using a polarizing microscope that periodic alignment occurred on the surface (refer to FIG. 15). In the liquid crystal alignment pattern of the third optically-anisotropic layer, the single period over which the optical axis derived from the liquid crystal compound rotated by 180° was 11.9 μm.

<Preparation of Wavelength Selective Phase Difference Layer>

A first wavelength selective phase difference layer and a second wavelength selective phase difference layer were prepared using the same method as that of Example 2.

<Preparation of Optical Element>

An optical element was prepared with the same method as that of Example 1 using the first optically-anisotropic member, the second optically-anisotropic member, the third optically-anisotropic member, the first wavelength selective phase difference layer, and the second wavelength selective phase difference layer.

Example 4

As the liquid crystal composition forming the optically-anisotropic layer, the following composition C-4 was prepared.

Composition C-4

| | |
|---|---|
| Liquid crystal compound L-2 | 42.00 parts by mass |
| Liquid crystal compound L-3 | 42.00 parts by mass |
| Liquid crystal compound L-4 | 16.00 parts by mass |
| Polymerization initiator PI-1 | 0.50 parts by mass |
| Leveling agent T-1 | 0.10 parts by mass |
| Methyl ethyl ketone | 176.00 parts by mass |
| Cyclopentanone | 44.00 parts by mass |

—Liquid Crystal Compound L-2—

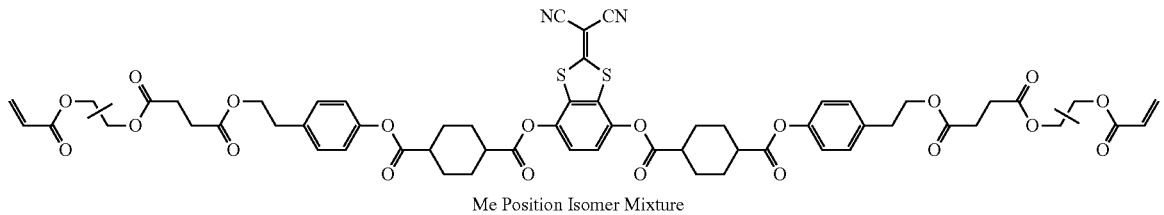

Me Position Isomer Mixture

—Liquid Crystal Compound L-3—

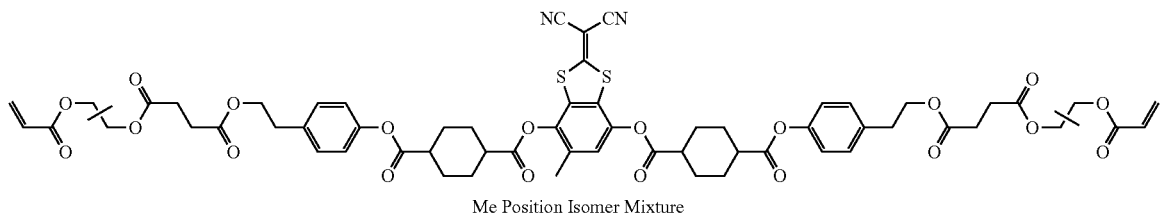

Me Position Isomer Mixture

—Liquid Crystal Compound L-4—

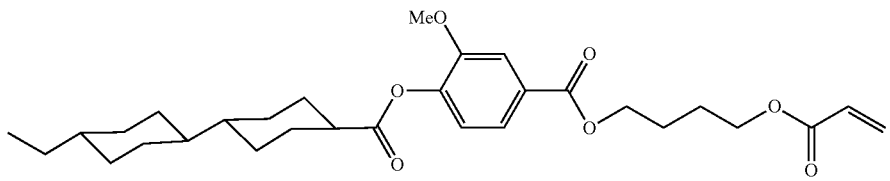 [SMILES: C=CC(=O)OCCCCOC(=O)c1ccc(OC(=O)C2CCC(C3CCC(CC)CC3)CC2)c(OC)c1]

—Polymerization initiator PI-1—

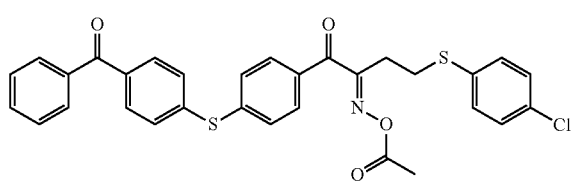 [SMILES: CC(=O)O/N=C(\CCSc1ccc(Cl)cc1)C(=O)c1ccc(Sc2ccc(C(=O)c3ccccc3)cc2)cc1]

A first optically-anisotropic member, a second optically-anisotropic member, and a third optically-anisotropic member were prepared using the same method as that of Example 1, except that, during the formation of the first optically-anisotropic layer, the second optically-anisotropic layer, and the third optically-anisotropic layer, the composition C-4 was used, the heating temperature on the hot plate was changed to 70° C., and in a case where the alignment film was exposed using the exposure device shown in FIG. 11, the intersection angle between two light components was changed.

Finally, in all of the first optically-anisotropic layer, the second optically-anisotropic layer, the third optically-anisotropic layer, $\Delta n_{550} \times$ thickness (Re(550)) of the liquid crystals was 275 nm, and it was verified using a polarizing microscope that periodic alignment occurred on the surface as shown in FIG. 3.

In addition, the following was verified using the same method as that of Example 1. In the liquid crystal alignment pattern of the first optically-anisotropic layer, the single period over which the optical axis derived from the liquid crystal compound rotated by 180° was 1.1 μm.

In the liquid crystal alignment pattern of the second optically-anisotropic layer, the single period over which the optical axis derived from the liquid crystal compound rotated by 180° was 12.8 μm.

In the liquid crystal alignment pattern of the third optically-anisotropic layer, the single period over which the optical axis derived from the liquid crystal compound rotated by 180° was 11.9 μm.

<Preparation of Wavelength Selective Phase Difference Layer>

A first wavelength selective phase difference layer and a second wavelength selective phase difference layer were prepared using the same method as that of Example 2.

<Preparation of Optical Element>

An optical element was prepared with the same method as that of Example 1 using the first optically-anisotropic member, the second optically-anisotropic member, the third optically-anisotropic member, the first wavelength selective phase difference layer, and the second wavelength selective phase difference layer.

Comparative Example 1

As an optical element, the first optically-anisotropic member according to Example 1 was used.

Comparative Example 2

An optical element was prepared using the same method as that of Example 1, except that the first wavelength selective phase difference layer and the second wavelength selective phase difference layer were not used.

Comparative Example 2-2

An optical element was prepared using the same method as that of Example 1, except that, in the liquid crystal alignment patterns of the second optically-anisotropic member and the third optically-anisotropic member, the single period over which the optical axis derived from the liquid crystal compound rotated by 180° was changed to 3.0 μm.

Comparative Example 3

As an optical element, the first optically-anisotropic member according to Example 3 was used.

Comparative Example 4

An optical element was prepared using the same method as that of Example 2, except that the first wavelength selective phase difference layer and the second wavelength selective phase difference layer were not used.

Comparative Example 5

An optical element was prepared using the same method as that of Example 3, except that the first wavelength selective phase difference layer and the second wavelength selective phase difference layer were not used.

Example 5

<Preparation of First Optically-Anisotropic Member>

An alignment film P-7 was formed using the same method as that of the alignment film P-1, except that the exposure device shown in FIG. 13 was used as the exposure device for exposing the alignment film. By using the exposure device shown in FIG. 13, the single period of the alignment pattern gradually decreased toward the outer direction.

A first optically-anisotropic layer was formed using the same method as that of the first optically-anisotropic layer according to Example 1, except that multiple layers of the composition A-1 were applied to the alignment film P-7. Using the first optically-anisotropic layer, a first optically-anisotropic member was prepared.

Finally, in the first optically-anisotropic layer, $\Delta n_{550} \times$ thickness (Re(550)) of the liquid crystals was 275 nm, and it was verified using a polarizing microscope that concentric circular (radial) periodic alignment occurred on the surface as shown in FIG. 12. In the liquid crystal alignment pattern of the first optically-anisotropic layer, regarding the single period over which the optical axis of the liquid crystal compound rotated by 180°, the single period of a center portion was 325 µm, the single period of a portion at a distance of 2.5 mm from the center was 10.6 µm, the single period of a portion at a distance of 5.0 mm from the center was 5.3 µm. This way, the single period decreased toward the outer direction.

<Preparation of Second Optically-Anisotropic Member>

An alignment film P-8 was formed using the same method as that of the alignment film P-7, except that the focal length of the lens and the distance between the lens and the alignment film in the exposure device shown in FIG. 13 were changed.

A second optically-anisotropic layer was formed using the same method as that of the first optically-anisotropic layer according to Example 1, except that multiple layers of the composition A-1 were applied to the alignment film P-8. Using the second optically-anisotropic layer, a second optically-anisotropic member was prepared.

Finally, in the third optically-anisotropic layer, $\Delta n_{550} \times$ thickness (Re(550)) of the liquid crystals was 275 nm, and it was verified using a polarizing microscope that concentric circular (radial) periodic alignment occurred on the surface as shown in FIG. 12. In the liquid crystal alignment pattern of the second optically-anisotropic layer, regarding the single period over which the optical axis of the liquid crystal compound rotated by 180°, the single period of a center portion was 1135 µm, the single period of a portion at a distance of 2.5 mm from the center was 134 µm, the single period of a portion at a distance of 5.0 mm from the center was 65 µm. This way, the single period decreased toward the outer direction.

<Preparation of Third Optically-Anisotropic Member>

An alignment film P-9 was formed using the same method as that of the alignment film P-13, except that the focal length of the lens and the distance between the lens and the alignment film in the exposure device shown in FIG. 7 were changed.

A third optically-anisotropic layer was formed using the same method as that of the first optically-anisotropic layer according to Example 1, except that multiple layers of the composition A-3 were applied to the alignment film P-9. Using the third optically-anisotropic layer, a third optically-anisotropic member was prepared.

Finally, in the third optically-anisotropic layer, $\Delta n_{550} \times$ thickness (Re(550)) of the liquid crystals was 275 nm, and it was verified using a polarizing microscope that concentric circular (radial) periodic alignment occurred on the surface as shown in FIG. 12. In the liquid crystal alignment pattern of the third optically-anisotropic layer, regarding the single period over which the optical axis of the liquid crystal compound rotated by 180°, the single period of a center portion was 1095 µm, the single period of a portion at a distance of 2.5 mm from the center was 122 µm, the single period of a portion at a distance of 5.0 mm from the center was 60 µm. This way, the single period decreased toward the outer direction.

<Preparation of Wavelength Selective Phase Difference Layer>

A first wavelength selective phase difference layer and a second wavelength selective phase difference layer were prepared using the same method as that of Example 1.

<Preparation of Optical Element>

An optical element was prepared with the same method as that of Example 1 using the first optically-anisotropic member, the second optically-anisotropic member, the third optically-anisotropic member, the first wavelength selective phase difference layer, and the second wavelength selective phase difference layer.

Comparative Example 6

As an optical element, the first optically-anisotropic member according to Example 5 was used.

Comparative Example 7

An optical element was prepared using the same method as that of Example 5, except that the first wavelength selective phase difference layer and the second wavelength selective phase difference layer were not used.

Examples 6 to 15

<Preparation of Optically-Anisotropic Member>

Various first optically-anisotropic members, second optically-anisotropic members, and third optically-anisotropic members having the single periods shown in Table 5 below over which the optical axis derived from the liquid crystal compound rotated by 180° in the liquid crystal alignment patterns were prepared using the same method as that of Example 1, except that, in a case where the alignment film was exposed using the exposure device shown in FIG. 11, the intersection angle between two light components was changed to various values.

In the liquid crystal alignment pattern of each of the optically-anisotropic members, the single period over which the optical axis derived from the liquid crystal compound rotated by 180° was verified using the same method as that of Example 1. In the liquid crystal alignment pattern, the single period over which the optical axis derived from the liquid crystal compound rotated by 180° was shown in Table 5.

<Preparation of Wavelength Selective Phase Difference Layer>

A first wavelength selective phase difference layer and a second wavelength selective phase difference layer were prepared using the same method as that of Example 2.

<Preparation of Optical Element>

An optical element was prepared with the same method as that of Example 1 using the first optically-anisotropic member, the second optically-anisotropic member, the third optically-anisotropic member, the first wavelength selective phase difference layer, and the second wavelength selective phase difference layer.

Example 16

<Preparation of Optically-Anisotropic Member>
A first optically-anisotropic member was prepared using the same method as that of the first optically-anisotropic member according to Example 2.

In addition, a second optically-anisotropic member was prepared using the same method as that of the third optically-anisotropic member according to Example 2, except that, in a case where the alignment film was exposed using the exposure device shown in FIG. 11, the intersection angle between two light components was changed.

The following was verified using the same method as that of Example 1. In the liquid crystal alignment pattern of the first optically-anisotropic layer, the single period over which the optical axis derived from the liquid crystal compound rotated by 180° was 1.1 μm. In the liquid crystal alignment pattern of the second optically-anisotropic layer, the single period over which the optical axis derived from the liquid crystal compound rotated by 180° was 6.2 μm.

<Preparation of Wavelength Selective Phase Difference Layer>
A first wavelength selective phase difference layer was prepared using the same method as that of Example 2.

<Preparation of Optical Element>
An optical element was prepared with the same method as that of Example 1 using the first optically-anisotropic member, the second optically-anisotropic member, and the first wavelength selective phase difference layer.

Comparative Example 8

As an optical element, the first optically-anisotropic member according to Example 16 was used.

Comparative Example 9

An optical element was prepared using the same method as that of Example 16, except that the first wavelength selective phase difference layer was not used.

[Preparation of Circular Polarization Plate]
In order to perform "Evaluation of Wavelength Dependence of Transmission" described below, a circular polarization plate B, a circular polarization plate G, and a circular polarization plate R were prepared as follows.

First, the circular polarization plate G was prepared. First, the support on which the undercoat layer was formed was prepared using the same method as that of Example 1.

(Formation of Alignment Film P-10)
The following alignment film P-10-forming coating solution was continuously applied to the support on which the undercoat layer was formed using a #2.4 wire bar. The support on which the coating film of the alignment film P-10-forming coating solution was formed was dried using a hot plate at 80° C. for 5 minutes. As a result, an alignment film P-10 was formed.

<Alignment Film P-10-Forming Coating Solution>

| | |
|---|---|
| Material for photo-alignment Polymer A2 | 4.35 parts by mass |
| Low molecular weight compound B2 | 0.80 parts by mass |
| Crosslinking agent C1 | 2.20 parts by mass |
| Compound D1 | 0.48 parts by mass |
| Compound D2 | 1.15 parts by mass |
| Butyl acetate | 100.00 parts by mass |

<<Synthesis of Polymer A2>>
100 parts by mass of 2-(3,4-epoxycyclohexyl)ethyltrimethoxysilane, 500 parts by mass of methyl isobutyl ketone, and 10 parts by mass of triethylamine were charged into a reaction vessel equipped with a stirrer, a thermometer, a dripping funnel, and a reflux cooling pipe and were mixed with each other at room temperature. Next, 100 parts by mass of deionized water was dropped for 30 minutes using a dripping funnel, and a reaction was caused to occur at 80° C. for 6 hours while mixing the components with each other under reflux. After completion of the reaction, the organic phase was extracted and was cleaned with 0.2 mass % ammonium nitrate aqueous solution until water used for cleaning was neutral. Next, by distilling off the solvent and water under reduced pressure, epoxy-containing polyorganosiloxane was obtained as a viscous transparent liquid.

In a case where the epoxy-containing polyorganosiloxane was analyzed by nuclear magnetic resonance ($^1$H-NMR), a peak having a theoretical intensity based on an oxiranyl group was obtained in the vicinity of chemical shift (δ)=3.2 ppm, and it was verified that a side reaction of an epoxy group did not occur during the reaction. In the epoxy-containing polyorganosiloxane, the weight-average molecular weight Mw was 2,200, and the epoxy equivalent was 186 g/mol.

Next, 10.1 parts by mass of the epoxy-containing polyorganosiloxane obtained as described above, 0.5 parts by mass of an acrylic group-containing carboxylic acid (manufactured by Toagosei Co., Ltd., ARONIX M-5300, ω-carboxypolycaprolactone monoacrylate (polymerization degree n≈2)), 20 parts by mass of butyl acetate, 1.5 parts by mass of a cinnamic acid derivative obtained using a method of Synthesis Example 1 of JP2015-026050A, and 0.3 parts by mass of tetrabutylammonium bromide were charged into a 100 mL three-neck flask, and were stirred at 90° C. for 12 hours. After completion of the reaction solution was diluted with the same amount (mass) of butyl acetate as that of the reaction solution and was cleaned with water three times.

An operation of concentrating this solution and diluting the concentrated solution with butyl acetate was repeated twice. Finally, a solution including polyorganosiloxane (the following polymer A2) having a photo-alignable group was obtained. In the polymer A2, the weight-average molecular weight Mw was 9,000. In addition, as a result of $^1$H-NMR, the content of a component having a cinnamate group in the polymer A2 was 23.7 mass %.

—Polymer A2—

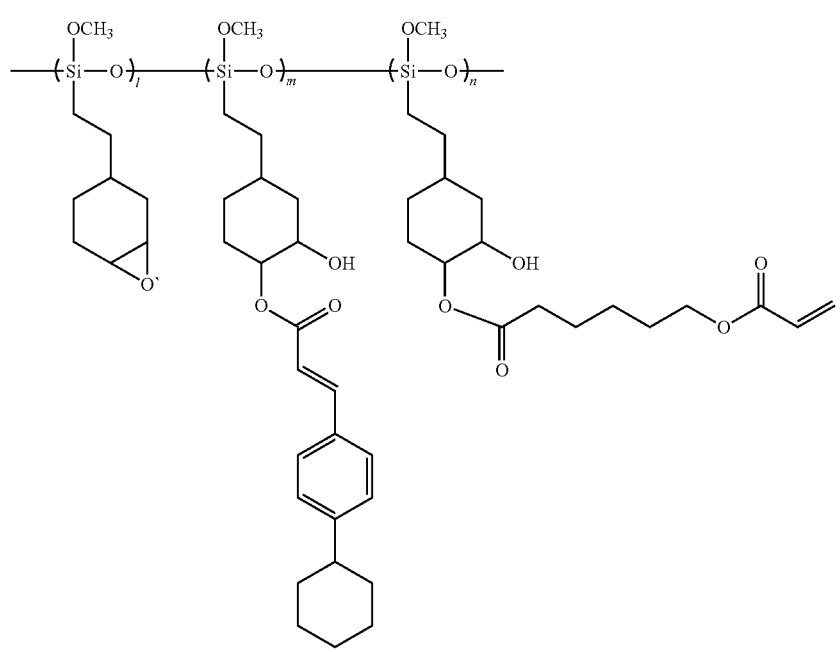

—Low Molecular Weight Compound B2—

The low molecular weight compound B2 shown in the following table (manufactured by Nissin Ion Equipment Co., Ltd., NOMCOAT TAB) was used.

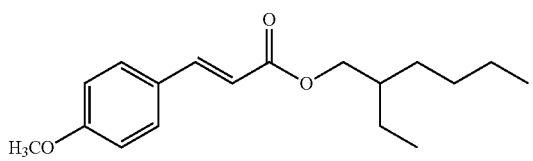

—Crosslinking Agent C1—

The crosslinking agent C1 (manufactured by Nagase ChemteX Corporation, DENACOL EX411) shown in the following table was used.

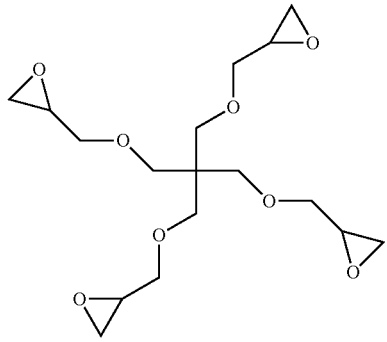

—Compound D1—

The following compound D1 (manufactured by Kawaken Fine Chemicals Co., Ltd., ALUMINUM CHELATE A(W)) shown in the following table was used.

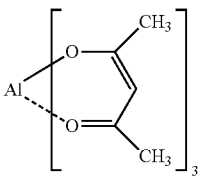

—Compound D2—

The compound D2 (manufactured by Toyo Science Corp., triphenylsilanol) shown in the following table was used.

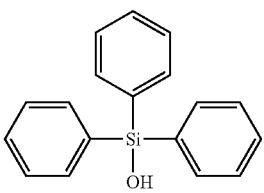

(Exposure of Alignment Film P-10)

By irradiating the obtained alignment film P-10 with polarized ultraviolet light (20 mJ/cm², using an extra high pressure mercury lamp), the alignment film P-10 was exposed.

[Preparation of Optically-Anisotropic Layer (λ/4 Plate)]

An optically-anisotropic layer was formed by applying the composition C-1 to the alignment film P-10. The applied coating film was heated using a hot plate at 110° C., the coating film was cooled to 60° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized, and an optically-anisotropic layer was prepared.

In the obtained optically-anisotropic layer, $\Delta n_{530} \times d$ (Re (530)) was 132.5 nm.

[Preparation of Circular Polarization Plate G]

A polarizing plate was bonded to the triacetyl cellulose film side of the optically-anisotropic layer (λ/4 plate) through a pressure sensitive adhesive to obtain a circular polarization plate G.

[Preparation of Circular Polarization Plate]

A circular polarization plate B and a circular polarization plate R were prepared using the same method as the above-described preparation method of the circular polarization plate, except that the thickness of the optically-anisotropic layer was changed such that $\Delta n_{450} \times d$ (Re(450)) was 112.5 nm and $\Delta n_{635} \times d$ (Re(635)) was 158.8 nm.

[Evaluation of Wavelength Dependence of Transmission]

In a case where light was incident into the prepared optical element from the front (direction with an angle of 0° with respect to the normal line), angles of transmitted light of red light, green light, and blue light with respect to the incidence light were measured. The angles of the transmitted light were angles of transmitted light with respect to the incidence light in a case where the incidence light was incident at 0°.

Specifically, each of laser beams having an output center wavelength in a red light range (635 nm), a green light range (530 nm), and a blue light range (450 nm) was caused to be vertically incident into the prepare optical element from a position at a distance of 10 cm in the normal direction, and transmitted light was captured using a screen disposed at a distance of 100 cm to calculate a transmission angle. That is, in this example, the designed wavelength λa of light having the longest wavelength was 635 nm, the designed wavelength λb of light having the intermediate wavelength was 530 nm, and the designed wavelength λc of light having the shortest wavelength was 450 nm.

Laser light was caused to be vertically incident into the circular polarization plate B, the circular polarization plate G, and the circular polarization plate R corresponding to the respective wavelengths to be converted into circularly polarized light, the circularly polarized light was incident into the prepared optical element, and the evaluation was performed.

Based on an average transmission angle $\theta_{ave}$ of the red light, the green light, and the blue light and a maximum transmission angle $\theta_{ave}$ and a minimum transmission angle $\theta_{ave}$ among the transmission angles of the red light, the green light, and the blue light, a wavelength dependence of refraction of transmitted light PE [%] was calculated from the following expression. As PE decreased, the wavelength dependence of refraction of transmitted light was low. In Examples 14 and Comparative Examples 8 and 9, only the red light and the blue light were evaluated.

$$PE[\%] = [(\theta_{max} - \theta_{min})/\theta_{ave}] \times 100$$

A case where PE was 5% or lower was evaluated as AA.
A case where PE was higher than 5% and 10% or lower was evaluated as A.
A case where PE was higher than 10% and 20% or lower was evaluated as B.
A case where PE was higher than 20% and 30% or lower was evaluated as C.
A case where PE was higher than 30% was evaluated as D.

In Examples 5 and Comparative Examples 6 and 7, laser light was caused to be vertically incident into the prepare optical element from a position at a distance of 5.0 mm from the center of the concentric circle of the liquid crystal alignment pattern, and the wavelength dependence PE [%] was calculated using the same method as described above.

The results are shown in the following table 5.

In each of the optically-anisotropic members, the optical characteristics (the angle of transmitted light) of the optical element were affected by only the optically-anisotropic layer. In addition, the members other than the optically-anisotropic layer were basically uniform. Therefore, the table shows only the characteristics of the optically-anisotropic layer.

TABLE 5

| | | Example 1 | Example 2 | Example 3 | Example 4 | Comparative Example 1 | Comparative Example 2 |
|---|---|---|---|---|---|---|---|
| First Optically-Anisotropic Member | Composition | A-1 | A-1 | B-1 | C-1 | A-1 | A-1 |
| | $\Delta_{n550} \times$ Thickness [nm] | 275 | 275 | 275 | 275 | 275 | 275 |
| | $(\Delta_{n450} \times$ Thickness$)/(\Delta_{n550} \times$ Thickness$)$ [nm] | 1.09 | 1.09 | 1.09 | 0.86 | 1.09 | 1.09 |
| | Single Period [μm] | 3.0 | 1.1 | 1.1 | 1.1 | 3.0 | 3.0 |
| First Wavelength Selective Phase Difference Layer (Convert Red Light) | | Provided | Provided | Provided | Provided | — | — |
| Second Optically-Anisotropic Member | Composition | A-1 | A-1 | B-1 | C-1 | — | A-1 |
| | $\Delta_{n550} \times$ Thickness [nm] | 275 | 275 | 275 | 275 | — | 275 |
| | $(\Delta_{n450} \times$ Thickness$)/(\Delta_{n550} \times$ Thickness$)$ [nm] | 1.09 | 1.09 | 1.09 | 0.86 | — | 1.09 |
| | Single Period [μm] | 36.9 | 12.8 | 12.8 | 12.8 | — | 36.9 |
| Second Wavelength Selective Phase Difference Layer (Convert Green Light) | | Provided | Provided | Provided | Provided | — | — |
| Third Optically-Anisotropic Member | Composition | A-1 | A-1 | B-1 | C-1 | — | A-1 |
| | $\Delta_{n550} \times$ Thickness [nm] | 275 | 275 | 275 | 275 | — | 275 |
| | $(\Delta_{n450} \times$ Thickness$)/(\Delta_{n550} \times$ Thickness$)$ [nm] | 1.09 | 1.09 | 1.09 | 0.86 | — | 1.09 |
| | Single Period [μm] | 34.3 | 11.9 | 11.9 | 11.9 | — | 34.3 |

TABLE 5-continued

| Evaluation | Average Transmission Angle [°] | 10 | 30 | 30 | 30 | 10 | 12 |
|---|---|---|---|---|---|---|---|
| | PE (Wavelength Dependence of Transmission) | AA | AA | AA | AA | D | D |

| | | Comparative Example 2-2 | Comparative Example 3 | Comparative Example 4 | Comparative Example 5 |
|---|---|---|---|---|---|
| First Optically-Anisotropic Member | Composition | A-1 | A-1 | A-1 | B-1 |
| | $\Delta_{n550}$ × Thickness [nm] | 275 | 275 | 275 | 275 |
| | ($\Delta_{n450}$ × Thickness)/($\Delta_{n550}$ × Thickness) [nm] | 1.09 | 1.09 | 1.09 | 1.09 |
| | Single Period [μm] | 3.0 | 1.1 | 1.1 | 1.1 |
| First Wavelength Selective Phase Difference Layer (Convert Red Light) | | Provided | — | — | — |
| Second Optically-Anisotropic Member | Composition | A-1 | — | A-1 | B-1 |
| | $\Delta_{n550}$ × Thickness [nm] | 275 | — | 275 | 275 |
| | ($\Delta_{n450}$ × Thickness)/($\Delta_{n550}$ × Thickness) [nm] | 1.09 | — | 1.09 | 1.09 |
| | Single Period [μm] | 3.0 | — | 12.8 | 12.8 |
| Second Wavelength Selective Phase Difference Layer (Convert Green Light) | | Provided | — | — | — |
| Third Optically-Anisotropic Member | Composition | A-1 | — | A-1 | B-1 |
| | $\Delta_{n550}$ × Thickness [nm] | 275 | — | 275 | 275 |
| | ($\Delta_{n450}$ × Thickness)/($\Delta_{n550}$ × Thickness) [nm] | 1.09 | — | 1.09 | 1.09 |
| | Single Period [μm] | 3.0 | — | 11.9 | 11.9 |
| Evaluation | Average Transmission Angle [°] | 8 | 30 | 37 | 37 |
| | PE (Wavelength Dependence of Transmission) | D | D | D | D |

As shown in the above-described table, the optical element according to the embodiment of the present invention includes a plurality of optically-anisotropic layers having a liquid crystal alignment pattern in which an optical axis of derived from a liquid crystal compound rotates in one in-plane direction, a single period in the liquid crystal alignment pattern of at least one optically-anisotropic layer is different from that of another optically-anisotropic layer, and a wavelength selective phase difference layer is provided between optically-anisotropic layers adjacent to each other. As a result, the wavelength dependence of an emission angle of transmitted light is small, and red light, green light, and blue light that are transmitted can be emitted substantially in the same direction. In addition it was found from a comparison between Examples 1 and 2 that by reducing the single period of the liquid crystal alignment pattern, the emission angle of circularly polarized light to be transmitted with respect to an incidence angle can be increased. Further, it was found from a comparison between Examples 2 and 4 that, by using the liquid crystals having reverse dispersibility, the brightness of the transmitted light in a wide range can be increased.

In addition, in the optical elements according to Examples 10 and 11 in which a relationship between the single period Λ over which the optical axis of the liquid crystal compound in the liquid crystal alignment pattern rotated by 180° and the designed wavelengths λa, λb, and λc was in the more preferable range "$0.7*\{[(\lambda a+\lambda c)\lambda b/(\lambda a-\lambda b)\lambda c]\Lambda_1\} \le \Lambda_2 \le 1.8*\{[(\lambda a+\lambda c)\lambda b/(\lambda a-\lambda b)\lambda c]\Lambda_1\}$" and "$0.7*\{[(\lambda a+\lambda c)\lambda b/(\lambda b-\lambda c)\lambda a]\Lambda_1\} \le \Lambda_3 \le 1.8*\{[(\lambda a+\lambda c)\lambda b/(\lambda b-\lambda c)\lambda a]\Lambda_1\}$", the wavelength dependence of the emission angle of transmitted light was smaller (Evaluation of PE: B).

In addition, in the optical elements according to Examples 8 and 9 in which a relationship between the single period Λ over which the optical axis of the liquid crystal compound in the liquid crystal alignment pattern rotated by 180° and the designed wavelengths λa, λb, and λc was in the still more preferable range "$0.8*\{[(\lambda a+\lambda c)\lambda b/(\lambda a-\lambda b)\lambda c]\Lambda_1\} \le \Lambda_2 \le 1.3*\{[(\lambda a+\lambda c)\lambda b/(\lambda a-\lambda b)\lambda c]\Lambda_1\}$" and "$0.8*\{[(\lambda a+\lambda c)\lambda b/(\lambda b-\lambda c)\lambda a]\Lambda_1\} < \Lambda_3 \le 1.3*\{[(\lambda a+\lambda c)\lambda b/(\lambda b-\lambda c)\lambda a]\Lambda_1\}$", the wavelength dependence of the emission angle of transmitted light was much smaller (Evaluation of PE: A).

In particular, in the optical elements according to Examples 1 to 4 and 5 to 7 in which a relationship between the single period Λ over which the optical axis of the liquid crystal compound in the liquid crystal alignment pattern rotated by 180° and the designed wavelengths λa, λb, and λc was in the still more preferable range "$0.9*\{[(\lambda a+\lambda c)\lambda b/(\lambda a-\lambda b)\lambda c]\Lambda_1\} < \Lambda_2 \le 1.15*\{[(\lambda a+\lambda c)\lambda b/(\lambda a-\lambda b)\lambda c]\Lambda_1\}$" and "$0.9*\{[(\lambda a+\lambda c)\lambda b/(\lambda b-\lambda c)\lambda a]\Lambda_1\} \le \Lambda_3 \le 1.15*\{[(\lambda a+\lambda c)\lambda b/(\lambda b-\lambda c)\lambda a]\Lambda_1\}$" and in Example 16 in which the relationship was in the range "$0.9*\{[(\lambda a+\lambda b)/(\lambda a-\lambda b)]\Lambda_1\} \le \Lambda_2 \le 1.15*\{[(\lambda a+\lambda b)/(\lambda a-\lambda b)]\Lambda_1\}$", the wavelength dependence of the emission angle of transmitted light was much smaller (Evaluation of PE: AA).

In addition, in the optical elements according to Examples 14 and 16 in which a relationship between the single period Λ over which the optical axis of the liquid crystal compound in the liquid crystal alignment pattern rotated by 180° and the designed wavelengths λa, λb, and λc satisfied only one of the expressions, the wavelength dependence of the emission angle of transmitted light was more than that of Examples 8 and 9 but was sufficiently small.

On the other hand, in Comparative Examples 1, 3, 6, and 8 each of which was formed of one optically-anisotropic layer, the wavelength dependence of an emission angle of transmitted light was large, and red light, green light, and blue light were not able to be emitted substantially in the same direction. In addition, in Comparative Examples 2, 4, 5, 7, and 9 each of which included a plurality of optically-anisotropic layers but did not include the wavelength selective phase difference layer, likewise, the wavelength dependence of an emission angle of transmitted light was large, and red light, green light, and blue light were not able to be emitted substantially in the same direction.

As can be seen from the above results, the effects of the present invention are obvious.

The present invention is suitably applicable to various uses where light is refracted in an optical device, for example, a diffraction element that causes light to be incident into a light guide plate of AR glasses or emits light to the light guide plate.

Explanation of References

10: optical element
12: first optically-anisotropic member
14: second optically-anisotropic member
16: third optically-anisotropic member
18G, 18R: wavelength selective phase difference layer
20: support
24a, 24B, 24C: alignment film
26A: first optically-anisotropic layer
26B: second optically-anisotropic layer
26C: third optically-anisotropic layer
30: liquid crystal compound
30A: optical axis
34: optically-anisotropic layer
40: display
42: light guide plate
60, 80: exposure device
62, 82: laser
64, 84: light source
68: beam splitter
70A, 70B, 90a, 90B: mirror
72A, 72B, 96: λ/4 plate
86, 94: polarization beam splitter
92: lens
$B_R$, $B_{2R}$: right circularly polarized light of blue light
$G_R$, $G_{1R}$, $G_{2R}$, $G_{3R}$: right circularly polarized light of green light
$R_R$, $R_{1R}$, $R_{3R}$: right circularly polarized light of red light
$B_{1L}$, $B_{3L}$: left circularly polarized light of blue light
$G_{1L}$, $G_{2L}$: left circularly polarized light of green light
$R_{1L}$, $R_{2L}$: left circularly polarized light of red light
M: laser light
MA, MB: beam
MP: P polarized light
MS: S polarized light
$P_O$: linearly polarized light
$P_R$: right circularly polarized light
$P_L$: left circularly polarized light
Q1, Q2: absolute phase
E1, E2: equiphase surface
U: user

What is claimed is:

1. An optical element comprising:
a plurality of optically-anisotropic layers, each of the optically-anisotropic layers being formed using a composition including a liquid crystal compound and having a liquid crystal alignment pattern in which a direction of an optical axis derived from the liquid crystal compound changes while continuously rotating in at least one in-plane direction; and
a wavelength selective phase difference layer that is disposed between at least one pair of two optically-anisotropic layers adjacent to each other among the plurality of optically-anisotropic layers and converts circularly polarized light in a specific wavelength range into circularly polarized light having an opposite turning direction,
wherein, in a case where, in the liquid crystal alignment pattern of each of the plurality of optically-anisotropic layers, a length over which the direction of the optical axis derived from the liquid crystal compound rotates by 180° in the in-plane direction in which the direction of the optical axis derived from the liquid crystal compound changes while continuously rotating is set as a single period, a length of the single period in at least one optically-anisotropic layer is different from that of another optically-anisotropic layer.

2. The optical element according to claim 1, comprising plural pairs of two optically-anisotropic layers, each pair of which being the one pair of two adjacent optically-anisotropic layers, and
a plurality of wavelength selective phase difference layers, each of which being the wavelength selective phase difference layer and disposed between the one pair of two adjacent optically-anisotropic layers,
wherein a specific wavelength range in which circularly polarized light is converted by the wavelength selective phase difference layer gradually decreases among the wavelength selective phase difference layers in an arrangement direction of the optically-anisotropic layer.

3. The optical element according to claim 1,
wherein the length of the single period in the liquid crystal alignment patterns of the optically-anisotropic layers varies depending on all the optically-anisotropic layers.

4. The optical element according to claim 1, comprising a plurality of wavelength selective phase difference layers, each of which being the wavelength selective phase difference layer,
wherein each of the optically-anisotropic layers and the wavelength selective phase difference layers are alternately disposed.

5. The optical element according to claim 1,
wherein in the optically-anisotropic layer positioned at one end in an arrangement direction of the optically-anisotropic layers, the length of the single period in the liquid crystal alignment pattern is the shortest.

6. The optical element according to claim 1,
wherein at least one of the optically-anisotropic layers has in-plane regions having different lengths of the single periods in the liquid crystal alignment pattern.

7. The optical element according to claim 6,
wherein the length of the single period in the liquid crystal alignment pattern gradually decreases in the in-plane direction in which the direction of the optical axis derived from the liquid crystal compound changes while continuously rotating in the liquid crystal alignment pattern.

8. The optical element according to claim 1,
wherein the liquid crystal alignment pattern of each of the optically-anisotropic layer is a concentric circular pattern having a concentric circular shape where the in-plane direction in which the direction of the optical axis derived from the liquid crystal compound changes while continuously rotating moves from an inside toward an outside.

9. The optical element according to claim 1, comprising:
three or more optically-anisotropic layers; and
two or more wavelength selective phase difference layers.

10. The optical element according to claim 9,
wherein one wavelength selective phase difference layer converts circularly polarized light of red light into circularly polarized light having an opposite turning direction, and
another wavelength selective phase difference layer converts circularly polarized light of green light into circularly polarized light having an opposite turning direction.

11. The optical element according to claim 1, comprising a plurality of wavelength selective phase difference layers, each of which being the wavelength selective phase difference layer,
wherein the number of the wavelength selective phase difference layers is less than the number of the optically-anisotropic layers by one.

12. The optical element according to claim 1,
wherein the wavelength selective phase difference layer is consisting of a plurality of phase difference layers, and
an in-plane slow axis direction of at least one phase difference layer is different from that of another phase difference layer.

13. The optical element according to claim 12,
wherein at least one phase difference layer in the wavelength selective phase difference layer is a λ/4 plate.

14. The optical element according to claim 13,
wherein the λ/4 plate in the wavelength selective phase difference layer has reverse wavelength dispersibility, and
at least one other phase difference layer has forward wavelength dispersibility.

15. A light guide element comprising:
the optical element according to claim 1; and
a light guide plate.

16. The light guide element according to claim 15,
wherein two optical elements spaced from each other are provided in the light guide.

* * * * *